(12) United States Patent
Tsuchida

(10) Patent No.: US 8,456,519 B2
(45) Date of Patent: Jun. 4, 2013

(54) VIDEO DISPLAY SYSTEM, VIDEO DISPLAY METHOD AND DISPLAY APPARATUS

(75) Inventor: Shinya Tsuchida, Osaka (JP)

(73) Assignee: Panasonic Corporation, Osaka (JP)

( * ) Notice: Subject to any disclaimer, the term of this patent is extended or adjusted under 35 U.S.C. 154(b) by 204 days.

(21) Appl. No.: 12/914,145

(22) Filed: Oct. 28, 2010

(65) Prior Publication Data

US 2011/0090320 A1  Apr. 21, 2011

Related U.S. Application Data

(63) Continuation of application No. PCT/JP2009/005436, filed on Oct. 19, 2009.

(51) Int. Cl.
*H04N 13/04* (2006.01)

(52) U.S. Cl.
USPC .......................................................... 348/51

(58) Field of Classification Search
USPC ................................................. 348/42, 51
See application file for complete search history.

(56) References Cited

U.S. PATENT DOCUMENTS

| | | | |
|---|---|---|---|
| 2008/0170274 A1* | 7/2008 | Lee | ............... 358/474 |
| 2009/0237495 A1 | 9/2009 | Kawahara | |
| 2010/0066820 A1* | 3/2010 | Park et al. | ............... 348/53 |
| 2010/0074594 A1 | 3/2010 | Nakamura et al. | |
| 2010/0085374 A1* | 4/2010 | Lee et al. | ............... 345/589 |
| 2010/0104262 A1 | 4/2010 | Kanamaru et al. | |
| 2010/0134517 A1 | 6/2010 | Saikaly et al. | |
| 2010/0142924 A1 | 6/2010 | Yamashita et al. | |
| 2010/0226628 A1 | 9/2010 | Yamaji et al. | |
| 2010/0289883 A1 | 11/2010 | Goris et al. | |
| 2011/0157333 A1* | 6/2011 | Lee et al. | ............... 348/56 |

FOREIGN PATENT DOCUMENTS

| | | |
|---|---|---|
| EP | 0267418 | 5/1988 |
| JP | 2000-036969 | 2/2000 |
| JP | 2004-165713 | 6/2004 |
| JP | 2009-232249 | 10/2009 |
| KR | 20-0223322 | 5/2001 |
| WO | 2009/013636 | 1/2009 |
| WO | 2009/069026 | 6/2009 |

OTHER PUBLICATIONS

English language translations of JP 2000-036969 and JP 2004-165713.
International Search Report for PCT/JP2009/005436, dated Jan. 12, 2010.
Korea Office action, mail date is Aug. 22, 2011.
China Office Action in Chinese Patent Application No. 200980101246.5, dated Oct. 8, 2012.

* cited by examiner

*Primary Examiner* — Jay Patel
*Assistant Examiner* — Jessica Prince
(74) *Attorney, Agent, or Firm* — Greenblum & Bernstein, P.L.C.

(57) ABSTRACT

A video display apparatus includes pixels arranged in lines, a scanning signal transferor that supplies scanning signals to the pixels, and a data signal transferor that supplies a video signal to the pixels. A first controller supplies the video signal to the data signal transferor and causes the scanning signal transferor to supply a first scanning signal that corresponds to a first picture to the lines in the display from a head line to a final line and a second scanning signal that corresponds to a second picture subsequent to the first picture to the lines in the display from the final line to the head line.

34 Claims, 19 Drawing Sheets

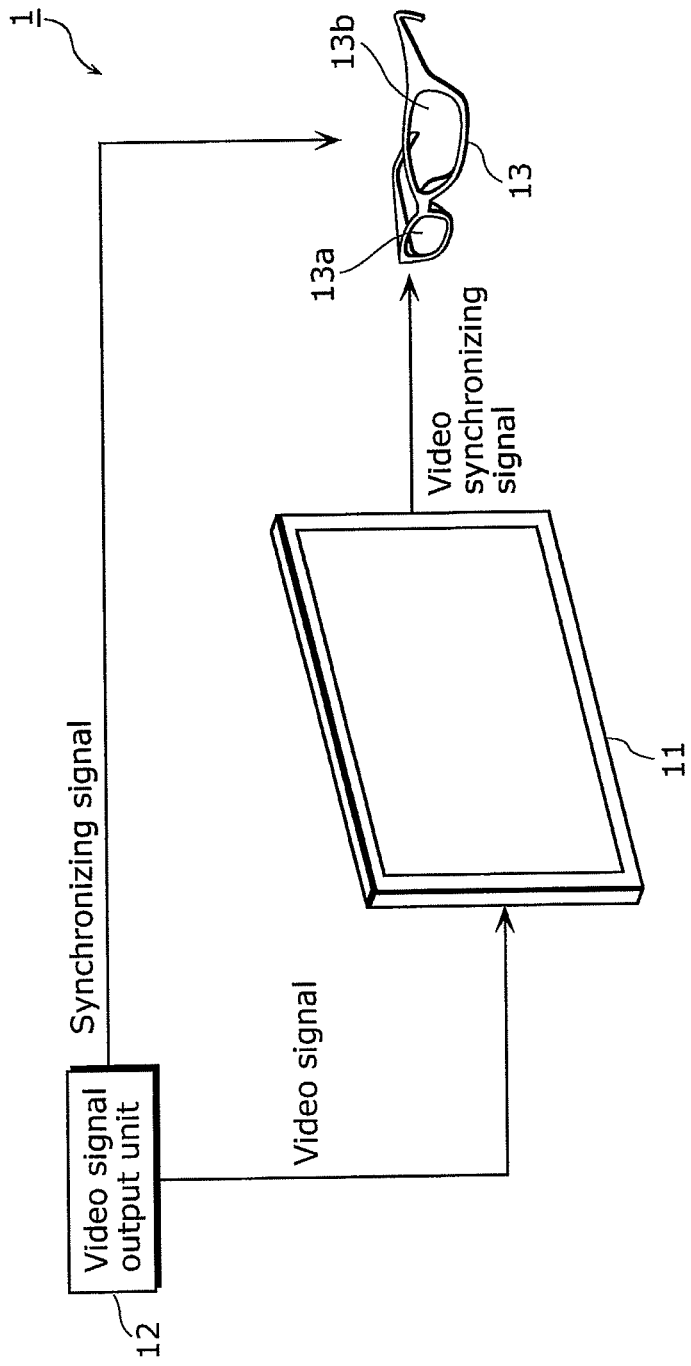

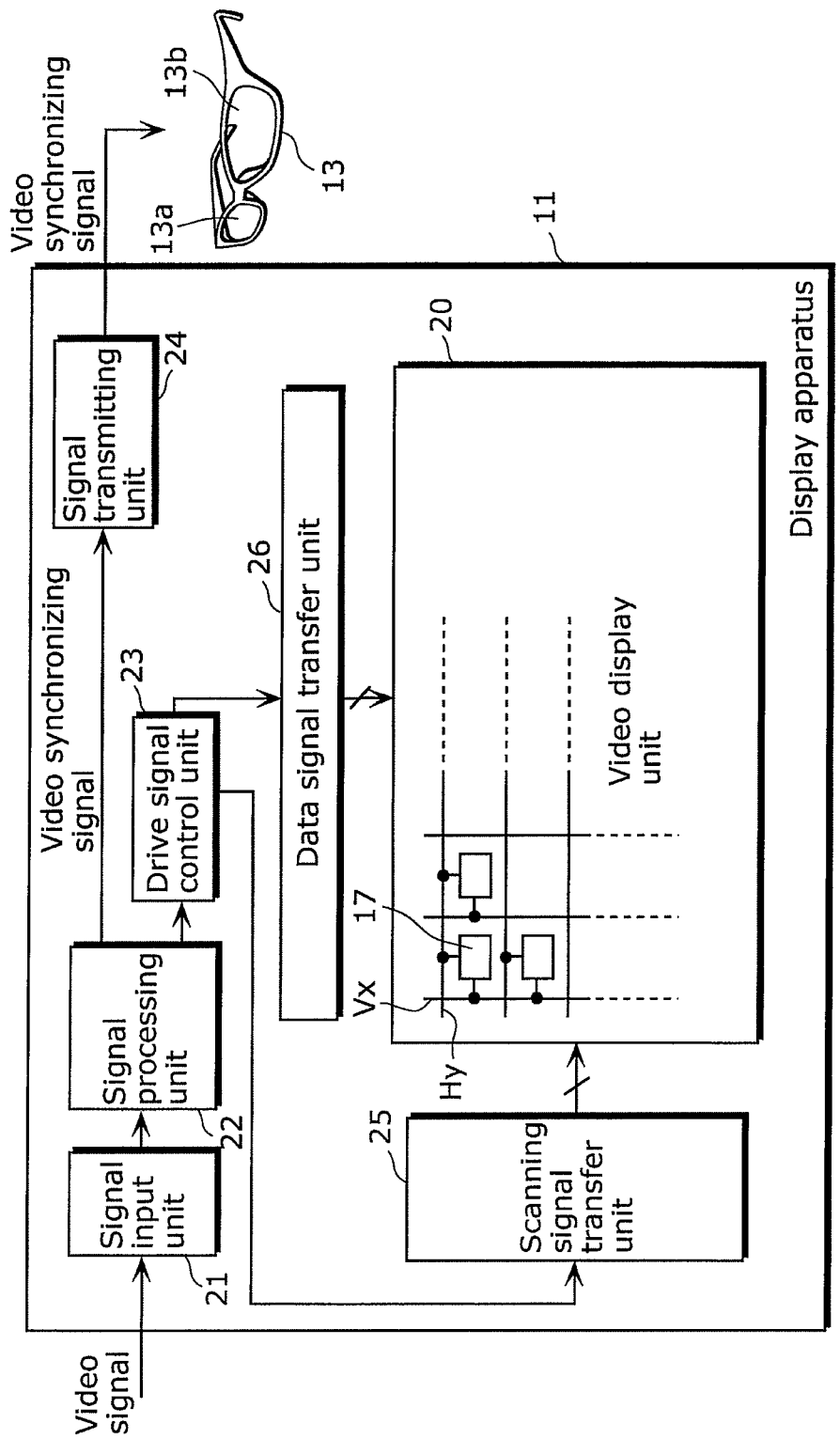

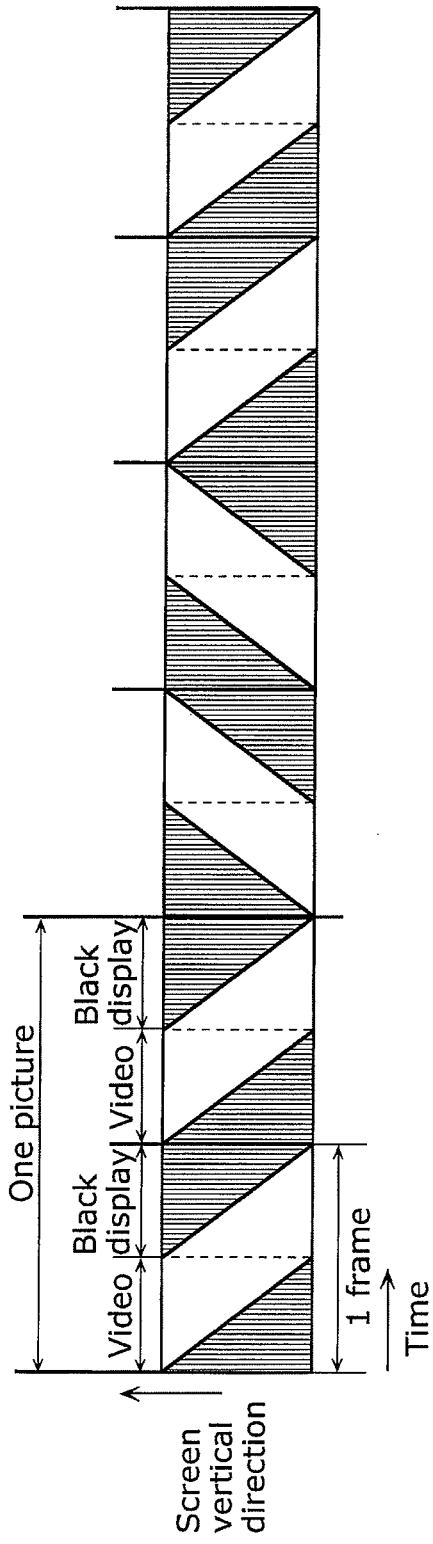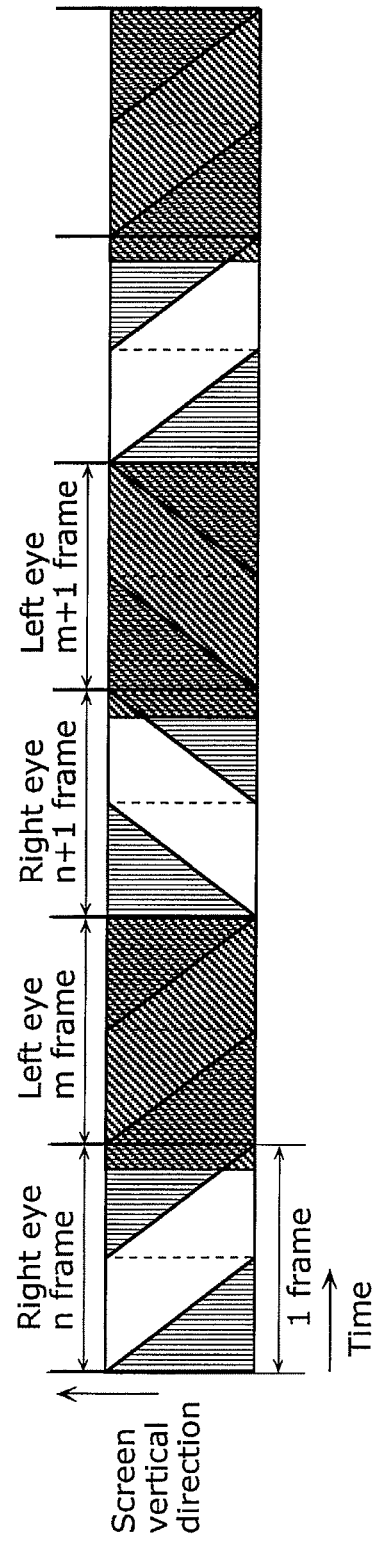
FIG. 9A
FIG. 9B

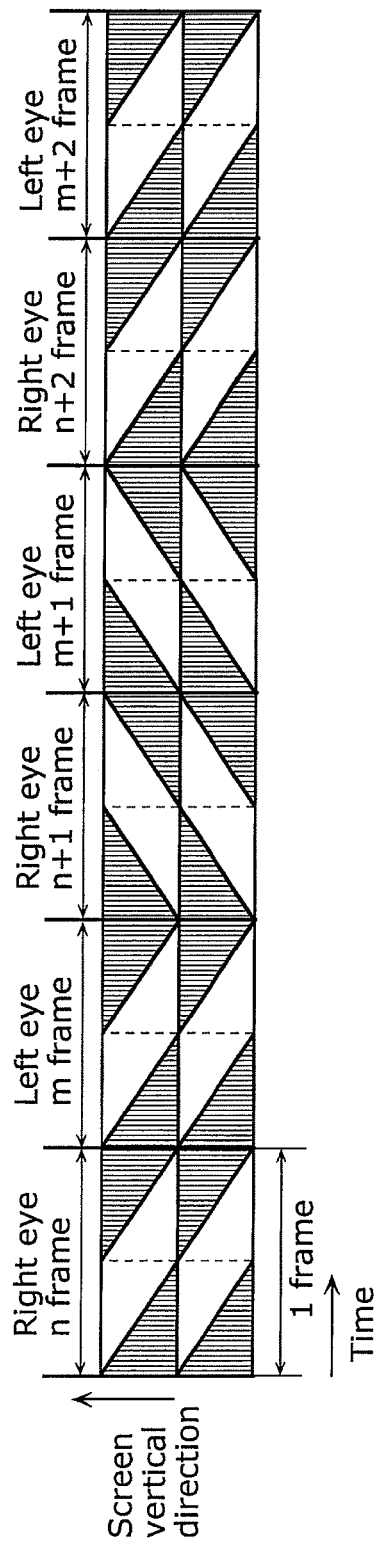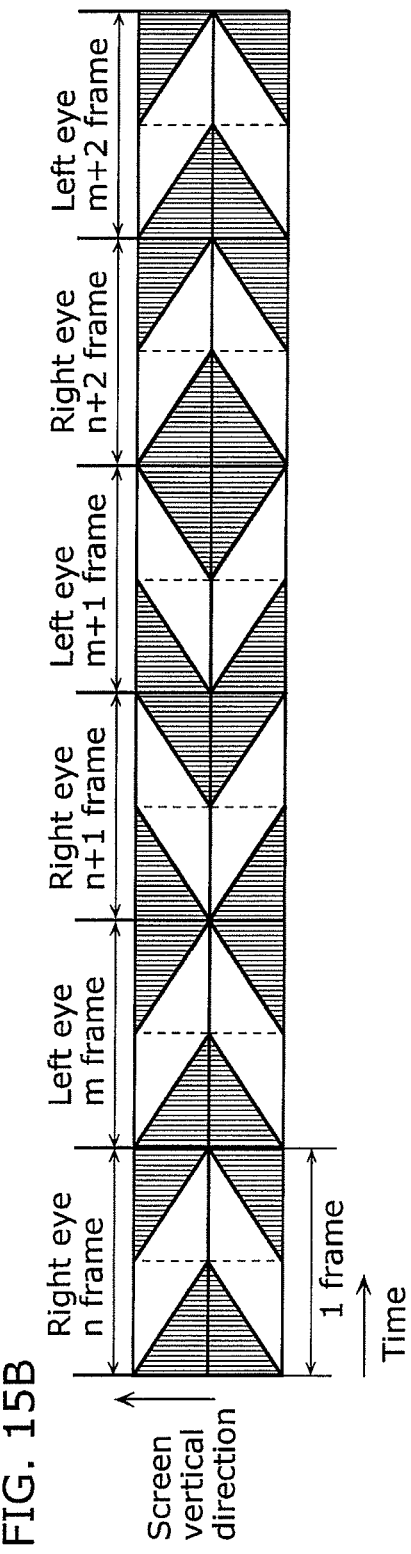
FIG. 15A
FIG. 15B

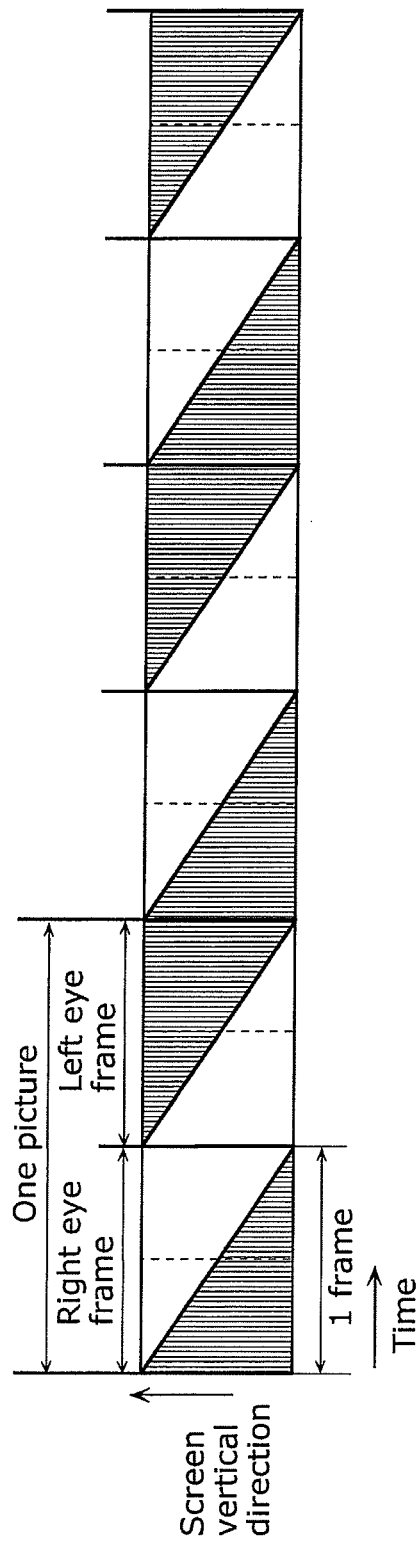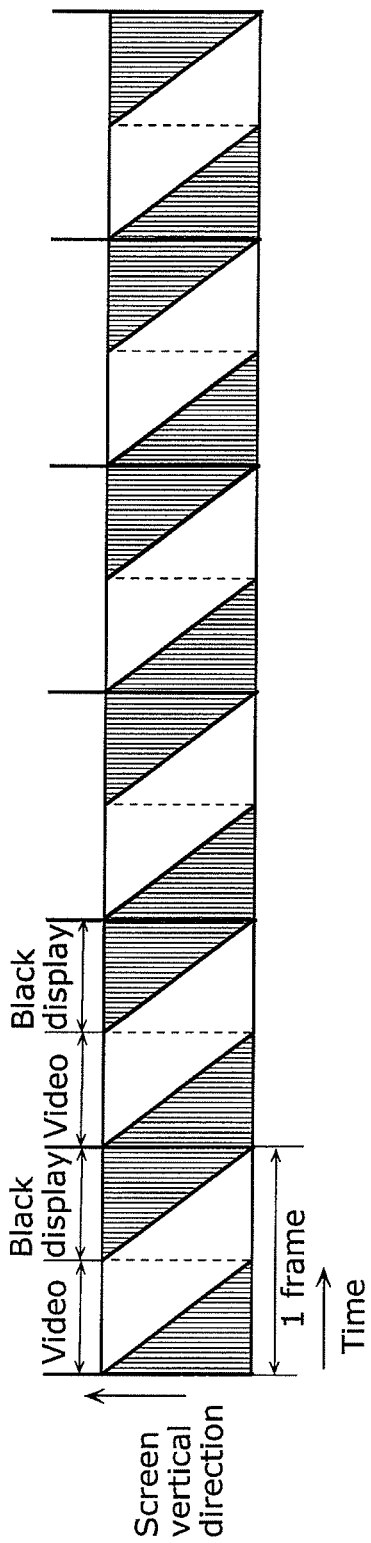

VIDEO DISPLAY SYSTEM, VIDEO DISPLAY METHOD AND DISPLAY APPARATUS

CROSS REFERENCE TO RELATED APPLICATION

This is a continuation application of PCT Application No. PCT/JP2009/005436, filed on Oct. 19, 2009, designating the United States of America, the disclosure of which, including the specification, drawings, and claims, is incorporated herein by reference in its entirety.

BACKGROUND OF THE INVENTION

1. Field of the Invention

The present invention relates to a video display system, a video display method, and a display apparatus which are configured to be adapted to displaying stereoscopic video.

2. Description of the Related Art

Conventionally, various schemes have been considered to display stereoscopic video. As an example, there is a method for generating stereoscopic video by alternately displaying image information for one eye and image information for the other eye which create a disparity for visually recognizing the stereoscopic video, and by switching shutters of glasses with electronic shutters (For example, see: Japanese Unexamined Patent Application Publication No. 2000-36969).

In this method, a video signal for a picture of the stereoscopic video is separated into a video signal for a first frame with which the image information for one eye is set and a video signal for a second frame with which the image information for the other eye is set. Then, the image information on the first frame and the image information on the second frame are alternately displayed in a display unit by the hold-type method in which a luminance of a previous image is held until pixel units receive an input of the next rewriting signal. A viewer can recognize one picture of the stereoscopic video through the glasses with electronic shutters, which open and close right and left shutters in synchronization with the first and the second frames.

Specifically, this is shown in FIG. 17. The figure shows a display time for which the video display unit displays the video signal, for one column of pixel units included in the video display unit. The vertical axis in the figure indicates a vertical direction of a screen and the horizontal axis indicates time. In other words, this shows that the video signal is serially supplied to the pixel units, from a pixel unit in an upper side of the video display unit to a pixel unit in a lower side. In addition, one picture of the stereoscopic video is made up of the first frame and the second frame. As the figure shows, when displaying the first frame with which right-eye image information for the right eye is set, the left eye shutter of the glasses with the electronic shutters is closed so that the right-eye image information is recognized, and when displaying the second frame with which left eye image information for the left eye is set, the right eye shutter is closed so that the left-eye image information is recognized. With this, the viewer can recognize the stereoscopic video.

In addition, as shown in FIG. 18, a black display period is provided between a display period for the video signal for the first frame and a display period for the video signal for the second frame so as to prevent the viewer from mixing up to recognize the first frame and the second frame.

SUMMARY OF THE INVENTION

However, in the conventional method described above, the following problem has been caused.

Specifically, for the shutters of the glasses with electronic shutters as described above, there is a response time from when the switching of the shutters starts to when the switching of the shutters is actually completed. Thus, it is necessary to perform the switching between opening and closing of the shutter not at the end of the video in each frame but in the middle of the video. In other words, as shown in FIG. 19, in the middle of the display of the first frame with which the right-eye image information is set, the right eye shutter is supposed to start closing in synchronization with the second frame with which the left-eye image information is set. As a result, when, in each frame, a video signal corresponding to one picture is supplied to lines in the display unit, starting from a head line in the upper side to a final line in the lower side, the shutter starts closing in the middle of the video in the vicinity of the final line of the frame, and thus the time for the viewer to recognize the video in a few lines in the lower side of the video display unit becomes shorter than in the upper side of the video display unit, so that the viewer recognizes that the video in the few lines in the lower side of the video display unit appear darkened. Thus, there is a conventional problem of luminance unevenness generated in the upper and lower sides of the video display unit due to the response time in switching the shutters.

In addition, as shown in FIG. 20, there is another problem that the entire picture becomes dark when shortening the period in which the video signal is displayed in synchronization with the period during which the shutters of the glasses with electronic shutters are completely open, because this reduces the time for displaying the video in all the lines.

In view of the above problems, the object of the present invention is to provide a video display system, a video display method, and a display apparatus which suppress luminance unevenness generated in the upper and the lower side of the screen.

In order to solve the problems described above, the video display system according to an aspect of the present invention is a video display system including a display apparatus and a glasses unit with electronic shutters, and the display apparatus includes: a display unit in which pixel units are arranged in units of lines; a scanning line drive circuit which supplies a scanning signal for driving the pixel units, to each of the pixel units; a data line drive circuit which supplies a video signal to each of the pixel units arranged in the display unit; a first control unit which supplies, to the data line drive circuit, a video signal of a stereoscopic image of a picture made up of a first frame with which image information for one eye is set and a second frame with which image information for the other eye is set, the image information for one eye and the image information for the other eye corresponding to a same picture of stereoscopic video; and a first communication unit which transmits, to the glasses unit with electronic shutters, a video synchronizing signal which indicates timing of switching between the first frame and the second frame of the picture, the first control unit further causes the scanning line drive circuit to supply: a video signal corresponding to a first picture to lines in the display unit from a head line to a final line, and a video signal corresponding to a second picture subsequent to the first picture to the lines in the display unit from the final line to the head line, the glasses unit with electronic shutters includes: a shutter for the one eye; a shutter for the other eye; a second communication unit which receives the video synchronizing signal; and a second control unit which controls, according to the video synchronizing signal, opening and closing of one of the shutter for the one eye and the shutter for the other eye, and the second control unit controls the shutter for the one eye and the shutter for the other eye so as to provide a shutter closing period in which both of the shutter for the one eye and the shutter for the other eye are closed when switching the opening and closing of the shutter for the one eye and the shutter for the other eye.

According to the video display system, the video display method, and the display apparatus according to the present invention, it is possible to suppress luminance unevenness generated in the upper and lower sides of the video display unit.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 1 is a block diagram showing a configuration of a video display system according to a first embodiment of the present invention;

FIG. 2A is a block diagram showing a configuration of a display apparatus in FIG. 1;

FIG. 9A is a diagram showing an example of display video;

FIG. 9B is a diagram showing display video that is recognized by a viewer with the right eye when opening and closing the right eye shutter of the glasses unit with electronic shutters, in display video shown in FIG. 9A;

FIG. 15A is a diagram showing an example of display video in a variation;

FIG. 15B is a diagram showing an example of display video in the variation;

FIG. 17 is a diagram showing an example of a conventional display video;

FIG. 18 is a diagram showing an example of the conventional display video;

DESCRIPTION OF THE PREFERRED EMBODIMENTS

Figure 2B:
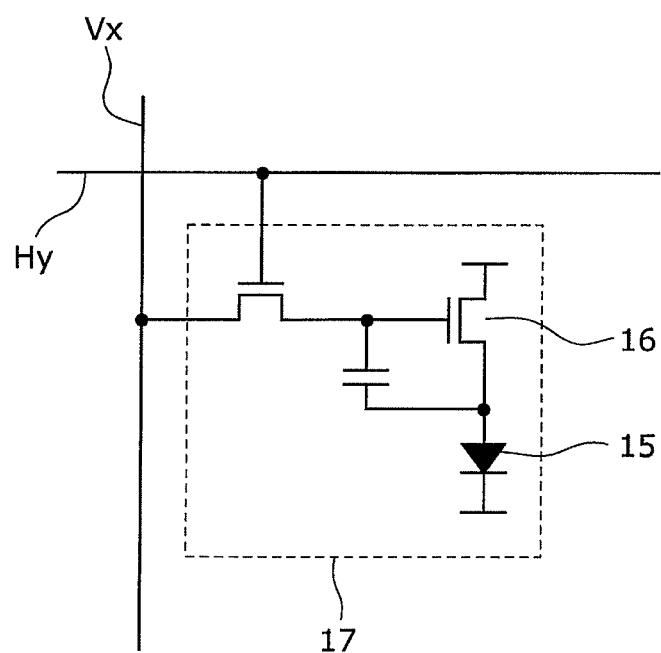
FIG. 2B is a circuit diagram showing a configuration of a pixel unit in FIG. 2A.

A video display system according to an implementation of the present invention is a video display system including a display apparatus and a glasses unit with electronic shutters, and the display apparatus includes: a display unit in which pixel units are arranged in units of lines; a scanning line drive circuit which supplies a scanning signal for driving the pixel units, to each of the pixel units; a data line drive circuit which supplies a video signal to each of the pixel units arranged in the display unit; a first control unit which supplies, to the data line drive circuit, a video signal of a stereoscopic image of a picture made up of a first frame with which image information for one eye is set and a second frame with which image information for the other eye is set, the image information for one eye and the image information for the other eye corresponding to a same picture of stereoscopic video; and a first communication unit which transmits, to the glasses unit with electronic shutters, a video synchronizing signal which indicates timing of switching between the first frame and the second frame of the picture, the first control unit further causes the scanning line drive circuit to supply: a video signal corresponding to a first picture to lines in the display unit from a head line to a final line, and a video signal corresponding to a second picture subsequent to the first picture to the lines in the display unit from the final line to the head line, the glasses unit with electronic shutters includes: a shutter for the one eye; a shutter for the other eye; a second communication unit which receives the video synchronizing signal; and a second control unit which controls, according to the video synchronizing signal, opening and closing of one of the shutter for the one eye and the shutter for the other eye, and the second control unit controls the shutter for the one eye and the shutter for the other eye so as to provide a shutter closing period in which both of the shutter for the one eye and the shutter for the other eye are closed when switching the opening and closing of the shutter for the one eye and the shutter for the other eye.

According to this implementation, since the luminance becomes higher in the second picture without the shutter being closed in the middle of the video in the lower side of the display unit, the luminance within the screen made up of the first picture and the second picture becomes equalized for the two pictures. As a result, it is possible to reduce luminance unevenness in the upper and lower sides of the display unit, thus achieving enhanced video display quality.

In addition, for example, since it is possible to reverse a scanning order simply by providing, between the first control unit and the scanning line drive circuit, a wiring for reversing the scanning order, no complicated control or circuit but a simple configuration is necessary for reducing luminance unevenness in the upper and lower sides of the display unit.

In another implementation of the present invention, in the video display system, the first control unit may cause the scanning line drive circuit to: supply a video signal corresponding to the first frame of the first picture to the lines in the display unit from the head line to the final line, and supply, subsequently, a black signal corresponding to the first frame of the first picture to the lines in the display unit from the head line to the final line for a period of time until the first control unit causes the scanning line drive circuit to supply a video signal corresponding to the second frame of the first picture to the lines in the display unit from the head line to the final line, the second frame of the first picture being subsequent to the first frame of the first picture.

According to this implementation, after displaying the video corresponding to the first frame of the first picture, the display unit displays a black picture until the display unit displays video corresponding to the second frame of the first picture. Thus, when the display unit displays the video corresponding to the second frame of the first picture, it is possible to prevent the video corresponding to the first frame of the first picture from being mixed up with the vision of the viewer as an afterimage. As a result, it is possible to prevent generation of a cross talk between videos that are serially displayed, thus achieving enhanced video display quality.

In another implementation of the present invention, in the video display system, when causing the scanning line drive circuit to supply the black signal corresponding to the first frame of the first picture to the lines in the display unit from the head line to the final line, the first control unit may cause the scanning line drive circuit to continuously supply, until the shutter closing period starts, the video signal corresponding to the first frame of the first picture without inserting the black signal corresponding to the first frame of the first picture.

According to this implementation, since the pixel units are caused to produce luminescence until the shutter closing period starts, instead of the black signal being inserted, it is possible to use, as time for producing luminescence, the time consumed for inserting an idle black signal that is supplied during the period when the shutter is not closed yet. As a result, it is possible to increase the luminance of the screen, thus achieving enhanced video display quality.

In addition, according to this implementation, it is possible to equalize an amount of signal supply between the first frame of the first picture and the first frame of the second picture. Thus, it is possible to increase, and equalize at the same time, the luminance between the first frame of the first picture and the first frame of the second picture.

In another implementation of the present invention, in the video display system, the first control unit may cause the scanning line drive circuit to simultaneously supply, during the shutter closing period, the black signal corresponding to the first frame of the first picture to a line into which the black signal corresponding to the first frame of the first picture has not been inserted.

According to this implementation, it is possible to reduce the time for supplying the black signal as compared to the case of serially supplying the black signal in order starting from the head line. Therefore, it is possible to use the time thus saved for causing the pixel units to produce luminescence, thus allowing the pixel units to produce luminescence for a longer time. As a result, it is possible to increase the luminance of the display unit.

In another implementation of the present invention, in the video display system, the first control unit may cause the scanning line drive circuit to: supply a video signal corresponding to the second frame of the first picture to the lines in the display unit from the head line to the final line, and supply, subsequently, a video signal corresponding to the first frame of the second picture to the lines in the display unit from the final line to the head line at a same speed as a speed at which the scanning line drive circuit has been caused to supply the video signal corresponding to the second frame of the first picture.

According to this implementation, the video signal corresponding to the first frame of the second picture is supplied to the lines in the display unit from the final line to the head line at the same speed as the speed at which the video signal corresponding to the second frame of the first picture has been supplied. With this, it is possible to equalize an amount of signal supply between the second frame of the first picture and the first frame of the second picture. Thus, it is possible to increase, and equalize a luminance duty between the second frame of the first picture and the first frame of the second picture.

In another implementation of the present invention, in the video display system, the first control unit may cause the scanning line drive circuit to: supply the video signal corresponding to the second frame of the first picture to the lines in the display unit from the head line to the final line, and supply, subsequently, a black signal corresponding to the second frame of the first picture to the lines in the display unit from the head line to the final line for a period of time until the first control unit causes the scanning line drive circuit to supply a video signal corresponding to the first frame of the second picture to the lines in the display unit from the final line to the head line, the first frame of the second picture being subsequent to the second frame of the first picture.

According to this implementation, after the video signal corresponding to the second frame of the first picture is supplied to the lines in the display unit from the head line to the final line, the black signal corresponding to the second frame of the first picture is supplied to the lines in the display unit from the head line to the final line for a period of time until the video signal corresponding to the first frame of the second picture is supplied to the lines in the display unit from the final line to the head line. With this, after the video corresponding to the second frame of the first picture is displayed, a black picture is displayed until the video corresponding to the first frame of the second picture is displayed. Thus, when the video corresponding to the first frame of the second picture is displayed on the screen, it is possible to prevent the video from being mixed up with the video corresponding to the second frame of the first picture. As a result, it is possible to prevent generation of a cross talk on the screen, thus achieving enhanced video display quality.

In another implementation of the present invention, in the video display system, when causing the scanning line drive circuit to supply the black signal corresponding to the second frame of the first picture to the lines in the display unit from the head line to the final line, the first control unit may cause the scanning line drive circuit to supply the black signal corresponding to the second frame of the first picture: to the head line that is to be supplied with the black signal corresponding to the second frame of the first picture, for a period of time double a length of the head line that is to be supplied with the black signal corresponding to the second frame of the first picture; and to the final line that is to be supplied with the black signal corresponding to the second frame of the first picture, for a period of time from when the scanning line drive circuit completes supplying the video signal which corresponds to the second frame of the first picture and which is to be supplied to the final line to when the scanning line drive circuit starts supplying the video signal which corresponds to the first frame of the second picture and which is to be supplied to the final line.

According to this implementation, for the head line that is to be supplied with the black signal, the black signal is supplied for a period of time double a length of the head line that is to be supplied with the black signal corresponding to the second frame of the first picture. In addition, for the final line that is to be supplied with the black signal, the black signal is supplied for a period of time from when the supply of the video signal which corresponds to the second frame of the first picture and which is to be supplied to the final line is completed to when the supply of the video signal which corresponds to the first frame of the second picture and which is to be supplied to the final line is started. With this, after the video corresponding to the second frame of the first picture is displayed, it is possible to insert a black picture until the video corresponding to the first frame of the second picture is displayed.

In another implementation of the present invention, in the video display system, the black signal need not be supplied to the final line that is to be supplied with the black signal corresponding to the second frame of the first picture, in the case where there is no time interval between when the scanning line drive circuit completes supplying the video signal which corresponds to the second frame of the first picture and which is to be supplied to the final line and when the scanning line drive circuit starts supplying the video signal which corresponds to the first frame of the second picture and which is to be supplied to the final line.

According to this implementation, the final line that is to be supplied with the black signal is not supplied with the black signal in the case where there is no time interval between when the supply of the video signal which corresponds to the second frame of the first picture and which is to be supplied to the final line is completed to when the supply of the video signal which corresponds to the first frame of the second picture and which is to supplied to the final line is started. With this, since the black signal is not inserted into the final line, the video corresponding to the second frame of the first picture is slightly influenced when the video corresponding to the first frame of the second picture is displayed on the screen. However, since the black signal is not displayed only in the final line in one picture, it is possible to reduce the influence on the entire picture to a minimum. As a result, it is possible to suppress the degradation of video quality to a minimum.

In another implementation of the present invention, in the video display system, when causing the scanning line drive circuit to supply the black signal corresponding to the second frame of the first picture to the lines in the display unit from the head line to the final line, the first control unit may cause the scanning line drive circuit to continuously supply, until the shutter closing period starts, the video signal corresponding to the second frame of the first picture without inserting the black signal corresponding to the second frame of the first picture.

According to this implementation, since the pixel units are caused to produce luminescence until the shutter closing period starts, instead of the black signal being inserted, it is possible to use, as time for producing luminescence, the time consumed for inserting an idle black signal that is supplied during the period when the shutter is not closed yet. As a result, it is possible to increase the luminance of the screen, thus achieving enhanced video display quality.

In addition, according to this implementation, it is possible to equalize an amount of signal supply between the second frame of the first picture and the second frame of the second picture. Thus, it is possible to increase, and equalize at the same time, the luminance between the second frame of the first picture and the second frame of the second picture.

In another implementation of the present invention, in the video display system, the first control unit may cause the scanning line drive circuit to simultaneously supply, during the shutter closing period, the black signal corresponding to the second frame of the first picture to a line into which the black signal corresponding to the second frame of the first picture has not been inserted.

According to this implementation, it is possible to reduce the time for supplying the black signal as compared to the case of serially supplying the black signal in order starting from the head line. Therefore, it is possible to use the time thus saved for causing the pixel units to produce luminescence, thus allowing the pixel units to produce luminescence for a longer time. As a result, it is possible to increase the luminance of the display unit.

In another implementation of the present invention, in the video display system, the first control unit may cause the scanning line drive circuit to: supply a video signal corresponding to the first frame of the second picture to the lines in the display unit from the final line to the head line, and supply, subsequently, a black signal corresponding to the first frame of the second picture to the lines in the display unit from the final line to the head line for a period of time until the first control unit causes the scanning line drive circuit to supply a video signal corresponding to the second frame of the second picture to the lines in the display unit from the final line to the head line, the second frame of the second picture being subsequent to the first frame of the second picture.

According to this implementation, after displaying the video corresponding to the first frame of the first picture, the display unit displays a black picture until displaying the video corresponding to the second frame of the first picture. Thus, when the display unit displays the video corresponding to the second frame of the first picture, it is possible to prevent the video corresponding to the first frame of the first picture from being mixed up with the vision of the viewer as an afterimage. As a result, it is possible to prevent generation of a cross talk between videos that are serially displayed, thus achieving enhanced video display quality.

In another implementation of the present invention, in the video display system, when causing the scanning line drive circuit to supply the black signal corresponding to the first frame of the second picture to the lines in the display unit from the head line to the final line, the first control unit may cause the scanning line drive circuit to continuously supply, until the shutter closing period starts, the video signal corresponding to the first frame of the second picture without inserting the black signal corresponding to the first frame of the second picture.

According to this implementation, since the pixel units are caused to produce luminescence until the shutter closing period starts, instead of the black signal being inserted, it is possible to use, as time for producing luminescence, the time consumed for inserting an idle black signal that is supplied during the period when the shutter is not closed yet. As a result, it is possible to increase the luminance of the screen, thus achieving enhanced video display quality.

In addition, according to this implementation, it is possible to equalize an amount of signal supply between the second frame of the first picture and the first frame of the second picture. Thus, it is possible to increase, and equalize at the same time, the luminance between the first frame of the first picture and the first frame of the second picture.

In another implementation of the present invention, in the video display system, the first control unit may cause the scanning line drive circuit to simultaneously supply, during the shutter closing period, the black signal corresponding to the first frame of the second picture to the lines from the final line to a predetermined line.

According to this implementation, it is possible to reduce the time for supplying the black signal as compared to the case of serially supplying the black signal to lines from the head line to a predetermined line. Therefore, it is possible to use the time thus saved for causing the pixel units to produce luminescence, thus allowing the pixel units to produce luminescence for a longer time. As a result, it is possible to increase the luminance of the display unit.

In another implementation of the present invention, in the video display system, the first control unit may segment a screen on which the video is displayed by the display unit into plural screen areas, and may cause the scanning line drive circuit to supply a video signal corresponding to each of the plural screen areas, to each of the plural screen areas resulted from the segmentation.

To display the stereoscopic video, it is necessary to increase drive frequency for driving the data line drive circuit and the scanning line drive circuit, that is, to reduce the time for supplying the video signal. However, to reduce the time for supplying the video signal, it is necessary to use a dedicated driver, and this increases manufacturing costs.

According to this implementation, as compared to the case of supplying the video signal without segmenting the screen into plural screen areas, it is possible to significantly reduce the time for supplying the video signal. Thus, even in the case of higher drive frequency for displaying the stereoscopic video, it is not necessary to use the dedicated driver, thus reducing the manufacturing costs.

In another implementation of the present invention, in the video display system, the first control unit may cause the scanning line drive circuit to supply, for a same frame, the video signal corresponding to the each of the plural screen areas in a same line direction, the plural screen areas being resulted from the segmentation.

In another implementation of the present invention, in the video display system, the first control unit may cause the scanning line drive circuit to supply the video signal corresponding to the each of the plural screen areas in the same line direction which is one of a direction from the head line to the final line and a direction from the final line to the head line.

In another implementation of the present invention, in the video display system, the first control unit may cause the scanning line drive circuit to supply, for the same frame, the video signal corresponding to the each of the plural screen areas in a reverse line direction, the plural screen areas being resulted from the segmentation.

In another implementation of the present invention, in the video display system, when causing the scanning line drive circuit to supply a video signal corresponding to one of the plural screen areas in the reverse direction that is the direction from the head line to the final line, the first control unit may cause the scanning line drive circuit to supply the video signal corresponding to another one of the plural screen areas in the direction from the final line to the head line.

According to this implementation, since the video signal corresponding to each of the plural screen areas is supplied, per screen area for the same frame, it is possible to significantly reduce the time for supplying the video signal as compared to the case of supplying the video signal without segmenting the screen into plural screen areas.

In another implementation of the present invention, in the video display system, the display apparatus may include an input unit for inputting the video signal from outside.

According to this implementation, the display unit may be provided with the input unit for inputting the video signal from outside.

In another implementation of the present invention, in the video display system, the display apparatus may include: an input unit for inputting, from outside, an unseparated video signal from which the video signal for the first frame and the video signal for the second frame are not separated yet; and a signal processing unit which generates video signals of the stereoscopic image of the picture made up of the first frame and the second frame by separating the video signal for the first frame and the video signal for the second frame from the unseparated video signal, and outputs the generated video signals to the first control unit.

According to this implementation, the display apparatus is provided with the input unit for inputting an unseparated video signal from which a video signal for the first frame and a video signal for the second frame are not separated yet. In this case, the signal processing unit generates video signals which constitute stereoscopic video of one picture by separating the video signal for the first frame and the video signal for the second frame from the unseparated video signal.

In another implementation of the present invention, in the video display system, the video signal may be a signal voltage corresponding to the video signal.

According to this implementation, the video signal may be a signal voltage corresponding to the video signal.

In another implementation of the present invention, in the video display system, each of the pixel units may include a light-emitting element and a drive element which controls driving of the light-emitting element.

In another implementation of the present invention, in the video display system, the drive element may control an electric current supply to the light-emitting element.

In another implementation of the present invention, in the video display system, the light-emitting element may be an organic electroluminescence element.

A video display method according to another implementation of the present invention is a video display method used with a display apparatus and a glasses unit with electronic shutters, and the display apparatus includes: a display unit in which pixel units are arranged in units of lines; a scanning line drive circuit which supplies a scanning signal for driving the pixel units, to each of the pixel units; a data line drive circuit which supplies a video signal to each of the pixel units arranged in the display unit; a first control unit which supplies, to the data line drive circuit, a video signal of a stereoscopic image of a picture made up of a first frame with which image information for one eye is set and a second frame with which image information for the other eye is set, the image information for one eye and the image information for the other eye corresponding to a same picture of stereoscopic video; and a first communication unit which transmits, to the glasses unit with electronic shutters, a video synchronizing signal which indicates timing of switching between the first frame and the second frame of the picture, the glasses unit with electronic shutters includes: a shutter for the one eye; a shutter for the other eye; a second communication unit which receives the video synchronizing signal; and a second control unit which controls, according to the video synchronizing signal, opening and closing of one of the shutter for the one eye and the shutter for the other eye, and the video display method further includes: causing, by the first control unit, the scanning line drive circuit to supply a video signal corresponding to a first picture to lines in the display unit from a head line to a final line; causing, by the first control unit, the scanning line drive circuit to supply a video signal corresponding to a second picture subsequent to the first picture to the lines in the display unit from the final line to the head line; and causing, by the second control unit, both of the shutter for the one eye and the shutter for the other eye to be closed when switching the opening and closing of the shutter for the one eye and the shutter for the other eye.

A display apparatus according to another implementation of the present invention is a display apparatus including: a display unit in which pixel units are arranged in units of lines; a scanning line drive circuit which supplies a scanning signal for driving the pixel units, to each of the pixel units; a data line drive circuit which supplies a video signal to each of the pixel units arranged in the display unit; and a first control unit which supplies, to the data line drive circuit, a video signal of a stereoscopic image of a picture made up of a first frame with which image information for one eye is set and a second frame with which image information for the other eye is set, the image information for one eye and the image information for the other eye corresponding to a same picture of stereoscopic video, and the first control unit further causes the scanning line drive circuit to supply: a video signal corresponding to a first picture to lines in the display unit from a head line to a final line, and a video signal corresponding to a second picture subsequent to the first picture to the lines in the display unit from the final line to the head line.

According to this implementation, since the luminance becomes higher in the second picture without the shutter being closed in the middle of the video in the lower side of the display unit, the luminance within the screen made up of the first picture and the second picture is equalized for the two pictures when the viewer views the video using glasses with electronic shutters. As a result, it is possible to improve luminance unevenness in the upper and lower sides of the display unit, thus achieving enhanced video display quality.

In addition, since it is possible to reverse a scanning order simply by providing, between the first control unit and the scanning line drive circuit, a wiring for reversing the scanning order, no complicated control or circuit but a simple structure is necessary to realize enhanced video display quality.

In another implementation of the present invention, in the display apparatus, each of the pixel units may include a light-emitting element and a drive element which controls driving of the light-emitting element.

In another implementation of the present invention, in the display apparatus, the drive element may control an electric current supply to the light-emitting element.

In another implementation of the present invention, in the display apparatus, the light-emitting element may be an organic electroluminescence element.

Hereinafter, the video display system, the video display method, and the display apparatus according to the embodiments of the present invention will be described with reference to the drawings. Note that the same or corresponding elements in all the figures are hereinafter appended with the same numerical references, and the overlapping descriptions will be omitted.

First Embodiment

A video display system according to a first embodiment is a video display system including a display apparatus and a glasses unit with electronic shutters, and the display apparatus includes: a display unit in which pixel units are arranged in units of lines; a scanning line drive circuit which supplies a scanning signal for driving the pixel units, to each of the pixel units; a data line drive circuit which supplies a video signal to each of the pixel units arranged in the display unit; a first control unit which supplies, to the data line drive circuit, a video signal of a stereoscopic image of a picture made up of a first frame with which image information for one eye is set and a second frame with which image information for the other eye is set, the image information for one eye and the image information for the other eye corresponding to a same picture of stereoscopic video; and a first communication unit which transmits, to the glasses unit with electronic shutters, a video synchronizing signal which indicates timing of switching between the first frame and the second frame of the picture, the first control unit further causes the scanning line drive circuit to supply: a video signal corresponding to a first picture to lines in the display unit from a head line to a final line, and a video signal corresponding to a second picture subsequent to the first picture to the lines in the display unit from the final line to the head line, the glasses unit with electronic shutters includes: a shutter for the one eye; a shutter for the other eye; a second communication unit which receives the video synchronizing signal; and a second control unit which controls, according to the video synchronizing signal, opening and closing of one of the shutter for the one eye and the shutter for the other eye, and the second control unit controls the shutter for the one eye and the shutter for the other eye so as to provide a shutter closing period in which both of the shutter for the one eye and the shutter for the other eye are closed when switching the opening and closing of the shutter for the one eye and the shutter for the other eye.

According to this configuration, since the luminance becomes higher in the second picture without the shutter being closed in the middle of the video in the lower side of the display unit, the luminance within the screen made up of the first picture and the second picture is equalized for the two pictures. As a result, it is possible to reduce luminance unevenness in the upper and lower sides of the display unit, thus achieving enhanced video display quality.

Hereinafter, the present embodiment is described with reference to the drawings, using an example of a video display system which includes an organic EL flat panel display as a display apparatus.

FIG. 1 is a block diagram showing a configuration of the video display system according to a first embodiment of the present invention. As the figure shows, a video display system 1 includes: a display apparatus 11, a video signal output unit 12, and a glasses unit with electronic shutters 13.

The video signal output unit 12 outputs a video signal to the display apparatus 11 and also outputs a synchronizing signal to the glasses unit with electronic shutters 13. Here, the video signal may be one of stereoscopic video and planer video. In addition, the synchronizing signal is a signal for transmitting, to the glasses unit with electronic shutters 13, whether the video signal outputted to the display apparatus 11 is for the frame with which right-eye image information is set or for the frame with which left-eye image information is set.

FIG. 2A is a block diagram showing a configuration of the display apparatus 11 in FIG. 1. As the figure shows, the display apparatus 11 includes: a video display unit 20, a signal input unit 21, a signal processing unit 22, a drive signal control unit 23, a signal transmitting unit 24, a scanning signal transfer unit 25, and a data signal transfer unit 26. Note that the video display unit 20, the signal input unit 21, the signal processing unit 22, the drive signal control unit 23, the scanning signal transfer unit 25, and the data signal transfer unit 26 correspond, respectively, to: the display unit, the input unit, the signal processing unit, the first control unit, the scanning line drive circuit, and the data line drive circuit in the present invention.

The video display unit 20 includes pixel units 17 in units of lines, and displays an image, based on the video signal inputted into the display apparatus 11 from the video signal output unit 12. Each pixel unit 17, as shown in FIG. 2B, for example, includes a light-emitting element 15 and a drive element 16 which controls an electric current supply to the light-emitting element 15. Furthermore, to each pixel unit 17, a gate line Hy (y=1, 2, ..., a, a+1, ..., y) and a data line Vx (x=1, 2, ..., x) are connected. Then, according to the video signal described above, the drive element 16 is driven by the signal inputted into the gate line Hy, and an electric current is supplied to the light-emitting element 15 according to the signal inputted from the data line Vx, so that the light-emitting element 15 produces luminescence. In this case, an organic electroluminescence element is used for the light-emitting element 15.

In addition, as shown in FIG. 2A, the signal input unit 21 receives, from the video signal output unit 12 provided outside the display apparatus 11, an unseparated video signal from which the video signal for the first frame with which the right-eye image information is set and the video signal for the second frame with which the left-eye image information is set are not separated, and supplies the unseparated video signal to the signal processing unit 22.

The signal processing unit 22 separates the image information for the first frame and the image information for the second frame from the unseparated video signal described above, and outputs the image information for the first frame and the image information for the second frame to the drive signal control unit 23 that is the first control unit. In addition, the signal processing unit 22 also supplies a video synchronizing signal which indicates timing of switching between the first frame and the second frame, to the signal transmitting unit 24.

The drive signal control unit 23 generates a scanning signal for driving the scanning signal transfer unit 25 in response to the first frame image information and the second frame image information inputted from the signal processing unit 22, and supplies the scanning signal to the scanning signal transfer unit 25. Specifically, the scanning signal transfer unit 25 is supplied with the scanning signal for scanning a video signal corresponding to the first picture in order starting from a gate line H1 corresponding to the head line (hereinafter, referred to as a head line H1) in the video display unit 20 to a gate line Hy corresponding to the final line (hereinafter, referred to as a final line Hy), and for scanning a video signal corresponding to the next second picture subsequent to the first picture in order starting from the final line Hy to the head line H1. In addition, the drive signal control unit 23 supplies to the data signal transfer unit 26, the first frame image information and the second frame image information that have been inputted from the signal processing unit 22.

The signal transmitting unit 24 transmits the video synchronizing signal supplied from the signal processing unit 22, to the glasses unit with electronic shutters 13.

The scanning signal transfer unit 25 has a configuration including a switch such as a shift register, and causes the light-emitting element 15 to produce luminescence according to the image information by supplying the scanning signal, which is supplied from the drive signal control unit 23, to the pixel units 17 included in the video display unit 20 via the gate line Hy, and by driving the drive element 16. In addition, the data signal transfer unit 26 supplies, to each pixel unit 17 via the data line Vx, a video signal which is to be displayed in each pixel unit 17 connected to the gate line Hy and which is to be scanned by the scanning signal transfer unit 25. At this time, when the scanning signal described above is supplied to the lines in the video display unit 20 from the head line H1 in the upper side to the final line Hy in the lower side, assuming that the gate line Hy in the upper side of the video display unit 20 is the head line, the data signal transfer unit 26 serially supplies to the data line Vx, with respect to each line, the video signal corresponding to each of the lines in order starting from the head line H1 in the upper side to the final line Hy in the lower side. In addition, when the scanning signal described above is supplied to the lines in the video display unit 20 from the final line Hy in the lower side to the head line H1 in the upper side, the data signal transfer unit 26 serially supplies to the data line Vx, with respect to each line, the video signal corresponding to each of the lines in order starting from the final line Hy in the lower side to the head line H1 in the upper side.

The glasses unit with electronic shutters 13 includes a right eye shutter 13a and a left eye shutter 13b.

Figure 3:
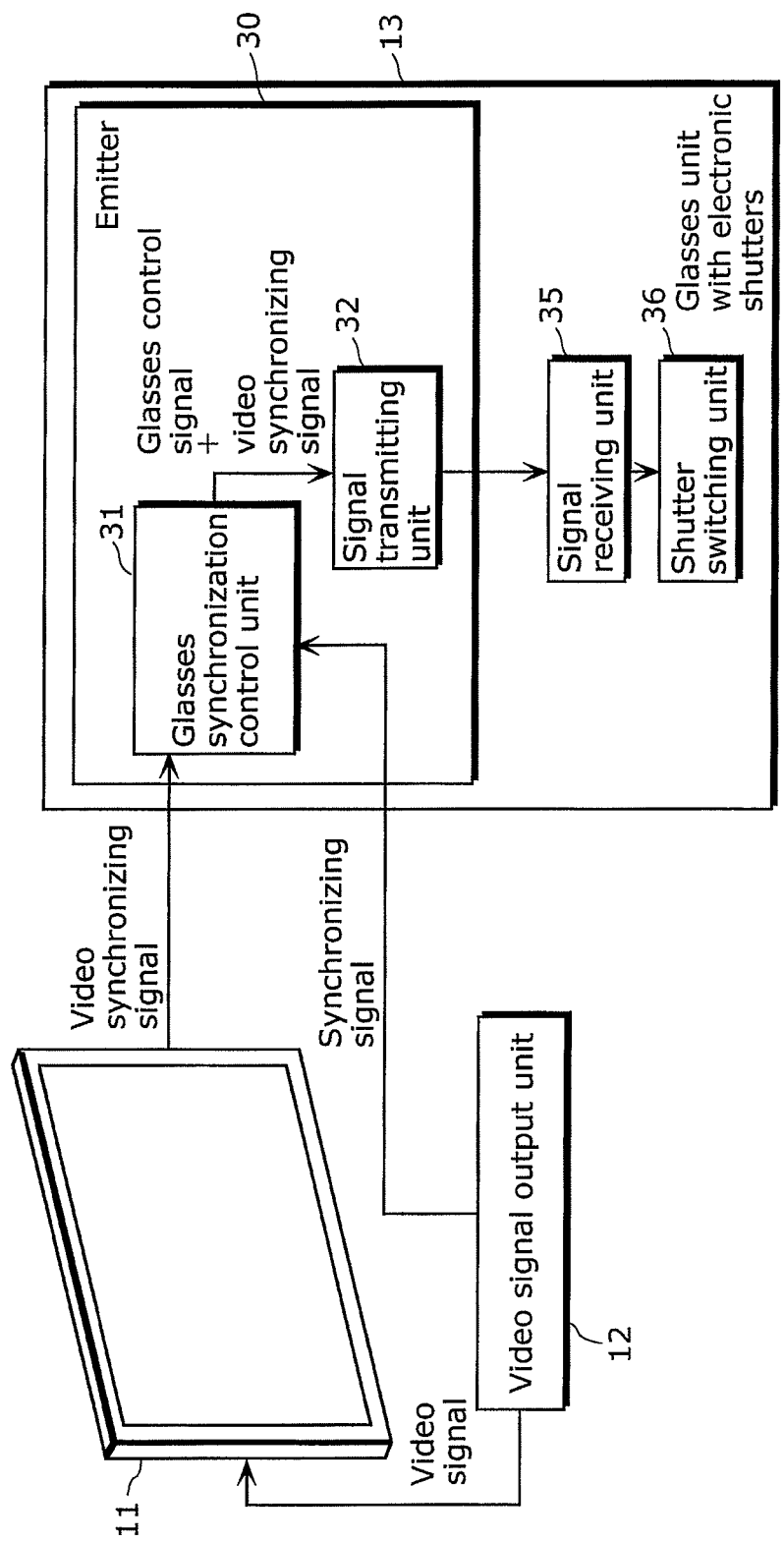
FIG. 3 is a block diagram showing a configuration of a glasses unit with electronic shutters in FIG. 1.

FIG. 3 is a block diagram showing a configuration of the glasses unit with electronic shutters. As the figure shows, the glasses unit with electronic shutters 13 includes an emitter 30, a signal receiving unit 35, and a shutter switching unit 36. In addition, the emitter 30 includes a glasses synchronization control unit 31 and a signal transmitting unit 32. Here, the emitter 30 may be provided outside instead of being incorporated in the glasses unit with electronic shutters 13, and may also be incorporated in the display apparatus 11. In addition, the emitter 30 may also have a configuration in which signals are received and transmitted, for example, using infrared rays, instead of being connected with wiring. Note that the glasses synchronization control unit 31 corresponds to the second control unit and the second communication unit in the present invention. In addition, the signal receiving unit 35 corresponds to the second receiving unit in the present invention, and the shutter switching unit 36 corresponds to the second control unit.

The glasses synchronization control unit 31 receives the video synchronizing signal outputted from the display apparatus 11 and the synchronizing signal outputted from the video signal output unit 12, and generates a glasses control signal. The glasses control signal is a control signal which causes one of the right eye shutter 13a and the left eye shutter 13b to open for a predetermined period from when the video synchronizing signal for each frame is started, and which closes the right eye shutter 13a or the left eye shutter 13b that has been open after a lapse of a predetermined period. With this, control which causes both shutters to be closed is performed when switching between opening and closing of the right eye shutter 13a and the left eye shutter 13b is performed.

Subsequently, the glasses synchronization control unit 31 outputs the video synchronizing signal and the glasses control signal to the signal transmitting unit 32.

The signal transmitting unit 32 further supplies the received video synchronizing signal and glasses control signal to the signal receiving unit 35. At this time, for example, in the case of the configuration in which the emitter 30 is provided outside the glasses unit with electronic shutters 13, these signals are transmitted from the signal transmitting unit 32 to the signal receiving unit 35 in the glasses unit with electronic shutters 13, by the infrared ray communication system.

When receiving the video synchronizing signal and the glasses control signal, the signal receiving unit 35 supplies these signals to the shutter switching unit 36. Then, the shutter switching unit 36 controls, according to the glasses control signal, the opening and closing of the right eye shutter 13a and the left eye shutter 13b of the glasses unit with electronic shutters 13 in synchronization with the video synchronizing signal.

An operation procedure performed by the video display system 1 is described below.

Figure 4:
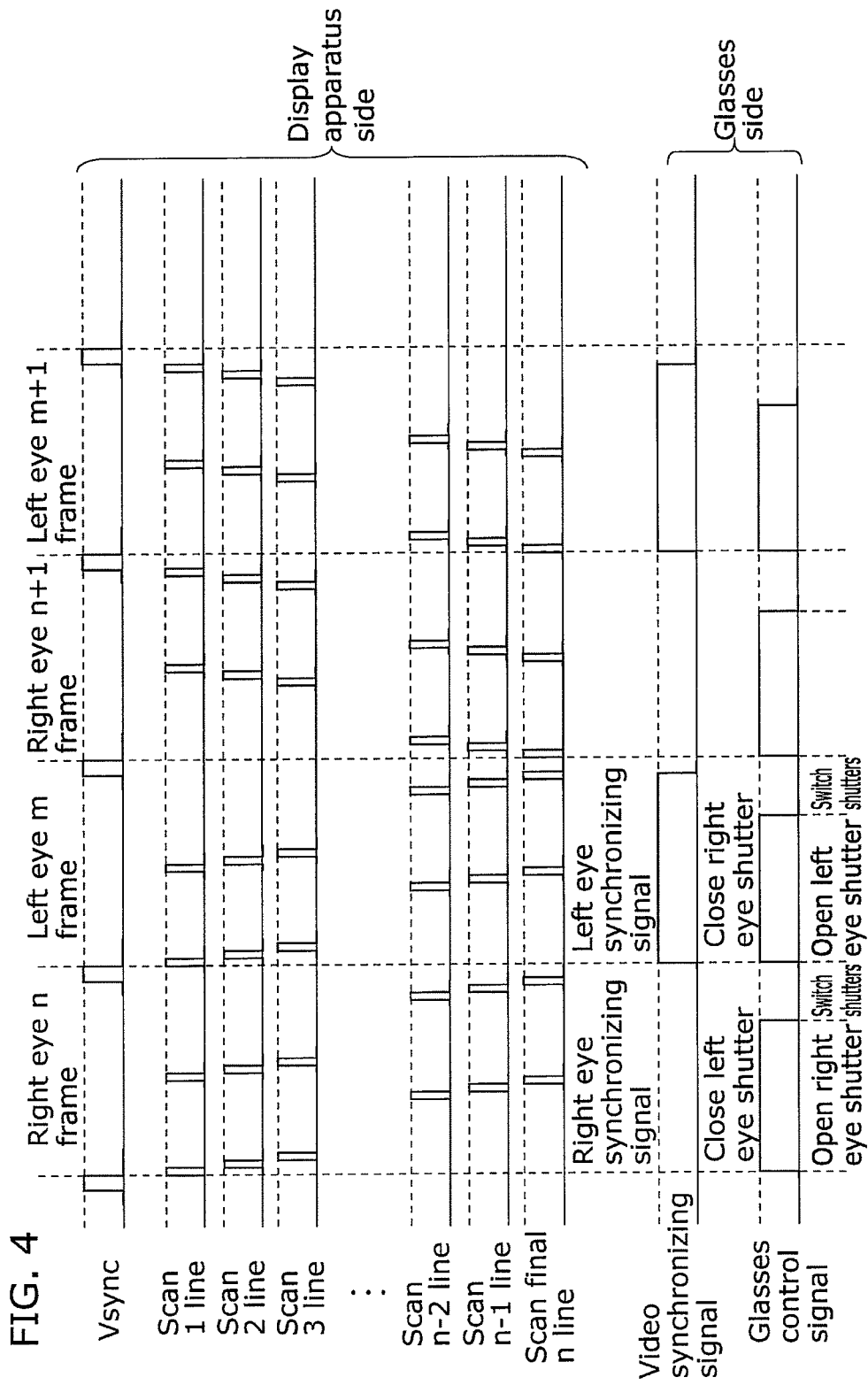
FIG. 4 is a timing chart indicating timing of driving the video display system shown in FIG. 1.
Figure 10:
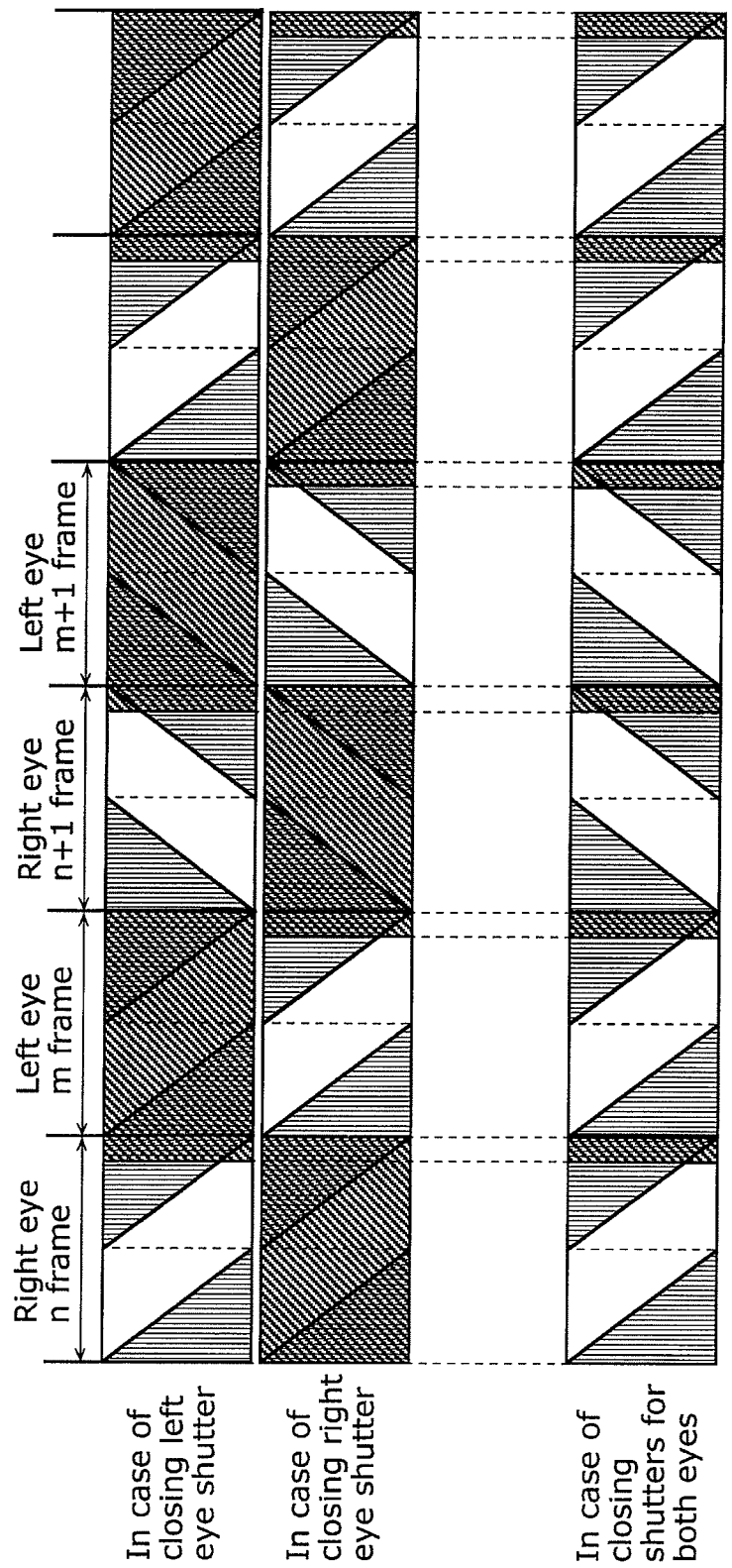
FIG. 10 is a diagram showing display video when opening and closing the shutters of the glasses unit with electronic shutters in the first embodiment.

FIG. 4 is a timing chart indicating timing of driving the video display system 1 shown in FIG. 1, and FIGS. 5 to 8 are flowcharts showing a flow of the operation of the video display system 1. In addition, FIGS. 9A, 9B, and 10 are diagrams each showing an example of the display video.

In FIG. 4, when a video signal Vsync is inputted into the display apparatus 11 during a period when the video signal for the right n frame is displayed, the scanning signal transfer unit 25 serially applies a first pulse signal for scanning the video signal in order starting from the upper side of the video display unit 20 toward the lower side, that is, from the head line H1 in the video display unit 20 to the final line Hy. Subsequently, a second pulse signal for scanning the black signal is serially applied in order starting from the head line H1 to the final line Hy. The black signal is scanned prior to the scanning of the video signal for a left eye m frame so that the viewer does not mix up to recognize the video signal for a right eye n frame and the video signal for the next left eye m frame. In other words, after the video display unit 20 displays the video corresponding to the right eye n frame, by scanning the black signal to display a black picture in the video display unit 20 for a period of time until the video display unit 20 displays the video corresponding to the left eye m frame, it is possible to prevent the video corresponding to the right eye n frame from being mixed up with the vision of the viewer as an afterimage when the video corresponding to the left eye m frame is displayed. As a result, it is possible to prevent generation of a cross talk between the videos that are serially displayed and correspond, respectively, to the right eye n frame and the left eye m frame, thus achieving enhanced video display quality.

When the scanning of the right eye n frame is finished, the video signal Vsync for the left eye m frame is subsequently inputted into the display apparatus 11, so as to start the next scanning. Likewise, in the left eye m frame, the scanning signal transfer unit 25 serially applies the first pulse signal for scanning the video signal in order starting from the upper side of the video display unit 20 toward the lower side, that is, from the head line H1 in the video display unit 20 to the final line Hy. Subsequently, the second pulse signal for scanning the black signal is serially applied in order starting from the head line H1 to the final line Hy. Note that the first picture is made up of the right eye n frame and the left eye m frame.

When the scanning of the right eye n frame is finished, the video signal Vsync for the right eye n+1 frame is subsequently inputted into the display apparatus 11, so as to start the next scanning. In the right eye n+1 frame, the scanning signal transfer unit 25 applies the first pulse signal for scanning the video signal at the same speed as the speed at which the video signal Vsync for the left eye m frame has been serially applied in order starting from the lower side of the video display unit 20 to the upper side, that is, from the final line Hy in the video display unit 20 to the head line H1. Subsequently, the second pulse signal for scanning the black signal is serially applied in order starting from the final line Hy to the head line H1.

When scanning of the right eye n+1 frame is finished, the video signal Vsync for the left eye m+1 frame is subsequently inputted into the display apparatus 11, so as to start the next scanning. Likewise, in the left eye m+1 frame, the scanning signal transfer unit 25 serially applies the first pulse signal for scanning the video signal in order starting from the lower side of the video display unit 20 toward the upper side, that is, from the final line Hy in the video display unit 20 to the head line H1. Subsequently, the second pulse signal for scanning the black signal is serially applied in order starting from the final line Hy to the head line H1. Note that the second picture is made up of the right eye n+1 frame and the left eye m+1 frame.

Figure 5:
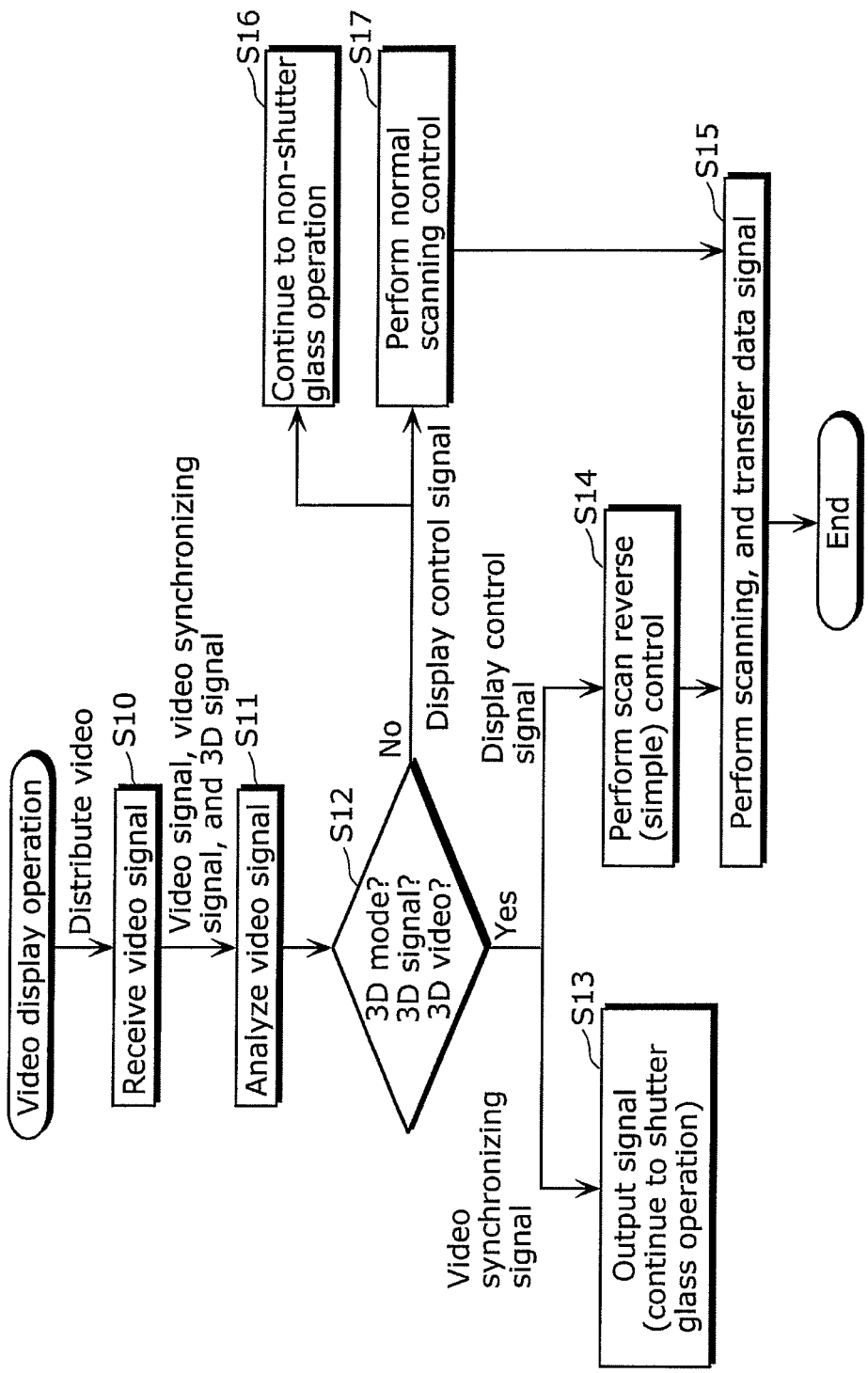
FIG. 5 is a flowchart showing an operation of the video display system shown in FIG. 1.

FIG. 5 shows a flowchart for causing the video display system 1 to operate with the driving timing described above.

The video signal Vsync for the right eye n frame, which is outputted by the video signal output unit 12, is received by the signal input unit 21 in the display apparatus 11 (Step S10). To this video signal Vsync, the video synchronizing signal indicating the timing of switching between the first frame and the second frame and a 3D signal including information regarding stereoscopic video are appended. Note that the 3D signal is not appended to a video signal Vsync that is not for stereoscopic video. Then, the signal input unit 21, which has received the video signal Vsync, supplies the video signal Vsync to the signal processing unit 22.

The signal processing unit 22 analyses the supplied video signal Vsync (Step S11), and separates the video synchronizing signal and the 3D signal from the video signal Vsync. Then, the signal processing unit 22 detects whether the 3D signal is appended to the video signal Vsync (Step S12), generates a display control signal which is a control signal for performing a stereoscopic display or a flat display of the video signal, and outputs the display control signal to the drive signal control unit 23. Note that the display control signal includes the scanning signal, and the video signal Vsync or the black signal which have been described above. Here, in the case where the 3D signal is appended to the video signal Vsync, the signal processing unit 22 further separates the first frame image information and the second frame image information from the video signal Vsync.

In addition, in the case where the 3D signal is appended to the video signal Vsync, the signal processing unit 22 outputs the video synchronizing signal to the glasses unit with electronic shutters 13, from the signal processing unit 22 via the signal transmitting unit 24. Then, the glasses unit with electronic shutters 13, which has received the video synchronizing signal, performs a shutter glass operation (Step S13). Note that the shutter glass operation is to be described in detail later.

Then, the drive signal control unit 23 performs scan reverse control according to the display control signal (Step S14). Note that the scan reverse control performed in the present embodiment is referred to as scan-reverse simple control.

Figure 6:
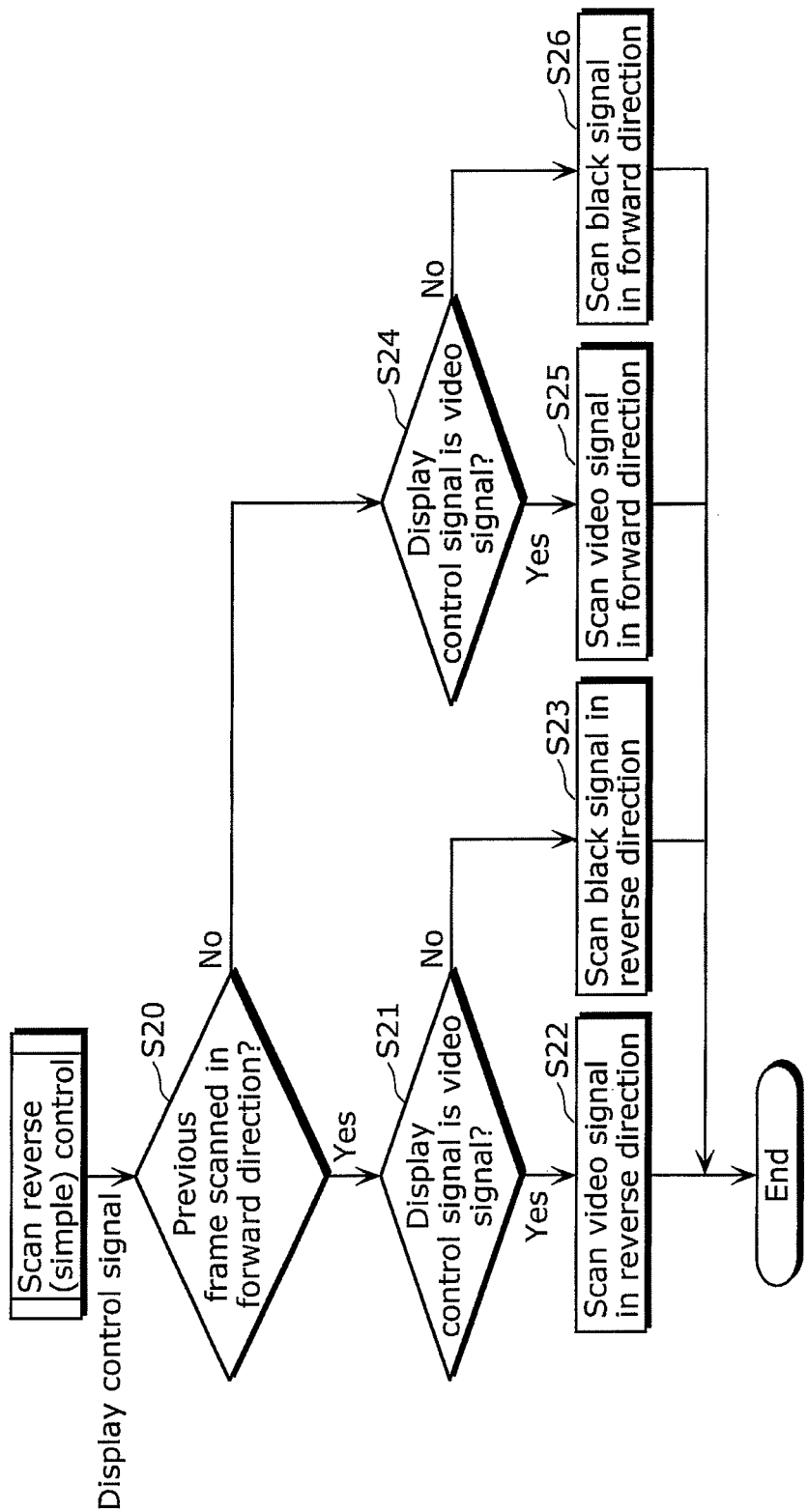
FIG. 6 is a flowchart showing processing for scan-reverse simple control in FIG. 5.

FIG. 6 is a flowchart showing processing for the scan-reverse simple control in FIG. 5. Here, the right eye n+1 frame shown in FIG. 4 is described as an example. The drive signal control unit 23, which has received the display control signal, detects whether the left eye m frame that is a previous frame has been scanned in a forward direction, that is, in a direction from the head line H1 in the upper side of the video display unit 20 toward the final line Hy in the lower side (Step S20). Then, when detecting that the left eye m frame has been scanned in the forward direction, the drive signal control unit 23 further detects whether the display control signal is a video signal Vsync (Step S21).

Then, when detecting that the display control signal is the video signal Vsync, the drive signal control unit 23 performs control for scanning the video signal Vsync in a reverse direction (Step S22). In other words, the drive signal control unit 23 supplies a scanning signal to the scanning signal transfer unit 25 such that scanning is performed at the same speed as in the scanning of the video signal Vsync for the left eye m frame and in the direction reverse to the scanning direction for the left eye m frame, that is, from the final line Hy in the lower side of the video display unit 20 toward the head line H1 in the upper side. With this, the scanning signal transfer unit 25 outputs the first pulse signal to the video display unit 20 via the gate line Hy with timing as shown in FIG. 4. In addition, the data signal transfer unit 26 serially outputs, to each data line Vx, a video signal Vsync corresponding to each line, in order starting from the final line Hy in the lower side to the head line H1 in the upper side (Step S15).

In addition, the drive signal control unit 23 performs control for scanning the black signal in the reverse direction when detecting that the display control signal is not the video signal Vsync, that is, when detecting that the display control signal is a black signal. In other words, the drive signal control unit 23 supplies a scanning signal to the scanning signal transfer unit 25 such that scanning is performed at the same speed as in the scanning of the video signal Vsync for the left eye m frame and in the direction reverse to the scanning direction for the left eye m frame, that is, from the final line Hy in the lower side of the video display unit 20 toward the head line H1 in the upper side. With this, the scanning signal transfer unit 25 outputs the second pulse signal to the video display unit 20 via the gate line Hy with timing as shown in FIG. 4. In addition, the data signal transfer unit 26 outputs the black signal to each data line Vx in the reverse direction, that is, in order starting from the final line Hy in the lower side to the head line H1 in the upper side (Step S15). Here, for the head line H1 that is to be supplied with the black signal, the black signal is supplied for a period of time double the length of the head line H1 that is to be supplied with the black signal corresponding to the left eye m frame, and for the final line Hy that is to be supplied with the black signal, the black signal is supplied for a period of time from when the supply of the video signal Vsync which corresponds to the left eye m frame and which is to be supplied to the final line Hy is completed to when the supply of the video signal Vsync which corresponds to the right eye n+1 frame and which is to be supplied to the final line Hy is started. Note that the black signal is not supplied to the final line Hy when there is no time interval between when the supply of the video signal Vsync which corresponds to the left eye m frame and which is to be supplied to the final line Hy is completed to when the supply of the video signal which corresponds to the right eye n+1 frame and which is to be supplied to the final line Hy is started, and the video signal Vsync for the right eye n+1 frame is supplied following the video signal Vsync for the left eye m frame.

In addition, on the left eye m+1 frame making up the same picture, the control for scanning in the reverse direction is also performed in the same manner as in the scanning of the right eye n+1 frame as described above.

Next, an example of the right eye n frame shown in FIG. 4 is described. The drive signal control unit 23, which has received the display control signal, detects whether the left eye m−1 frame (not shown) that is a previous frame has been scanned in the forward direction (Step S20). Then, when detecting that the left eye m−1 frame has not been scanned in the forward direction, the drive signal control unit 23 further detects whether the display control signal is a video signal Vsync (Step S24).

Then, when detecting that the display control signal is the video signal Vsync, the drive signal control unit 23 performs control for scanning the video signal Vsync in the forward direction (Step S25). In other words, the drive signal control unit 23 supplies a scanning signal to the scanning signal transfer unit 25 such that scanning is performed, from the head line H1 in the upper side of the video display unit 20 toward the final line Hy in the lower side. With this, the scanning signal transfer unit 25 serially outputs the first pulse signal to the video display unit 20 via the gate line Hy with timing as shown in FIG. 4. In addition, the data signal transfer unit 26 outputs, to each data line Vx, a video signal Vsync corresponding to each line, in order starting from the head line H1 in the upper side to the final line Hy in the lower side (Step S15).

In addition, the drive signal control unit 23 performs control for scanning the black signal in the forward direction when detecting that the display control signal is not the video signal Vsync, that is, when detecting that the display control signal is the black signal (Step S26). In other words, the drive signal control unit 23 supplies a scanning signal to the scanning signal transfer unit 25 such that the scanning is performed, starting from the head line H1 in the upper side of the video display unit 20 toward the final line Hy in the lower side. With this, the scanning signal transfer unit 25 outputs the second pulse signal to the video display unit 20 via the gate line Hy with timing as shown in FIG. 4. In addition, the data signal transfer unit 26 serially outputs the black signal to each data line Vx in the forward direction, that is, in order starting from the head line H1 in the upper side to the final line Hy in the lower side (Step S15).

In addition, on the left eye m frame making up the same picture, the control for scanning in the forward direction is also performed in the same manner as in the scanning of the right eye n frame as described above.

FIG. 9A is a diagram showing an example of the display video that is displayed as a result of the scanning described above. FIG. 9A shows the display time for a video signal that is displayed by one column of pixel units 17 in the video display unit 20, and the display time for the black signal. The vertical axis in the figure indicates a vertical direction of the screen and the horizontal axis indicates time. In other words, this shows that the video signal is serially supplied to the pixel units 17 in order starting from a pixel unit 17 in the upper side of the video display unit 20 to a pixel unit 17 in the lower side. In addition, by the scanning described above, as shown in FIG. 9A, the video signal and the black signal are alternately displayed in the video displayed in the video display unit 20. In addition, one picture of the stereoscopic video is made up of the right eye n frame and the left eye m frame. In addition, the right eye n frame and the right eye n+1 frame are opposite in the direction for scanning the video signal and the black signal, and likewise, the left eye m frame and the left eye m+1 frame are opposite in the direction for scanning the video signal and the black signal.

Next, the shutter glass operation of the glasses unit with electronic shutters is described. Here, the video synchronizing signal, when it is Low, indicates that it is the video signal for the right eye, and indicates that it is the video signal for the left eye when it is High. In addition, the glasses control signal supplied from the glasses synchronization control unit 31 is a signal which opens the shutter when the signal is High, and closes the shutter when the signal is Low.

As shown in FIG. 4, when the video signal Vsync for the right eye n frame is inputted, the glasses unit with electronic shutters 13 is supplied with a Low-level video synchronizing signal and a High-level glasses control signal from the display apparatus 11, so that control for opening the right eye shutter 13a and closing the left eye shutter 13b is performed. This allows the user to recognize the video signal for the right eye with the right eye. In addition, for the next left eye m frame, the right eye shutter 13a is closed, but due to the response time in opening and closing of the shutters, the glasses control signal becomes Low in the middle of the period for the right eye n frame, and the switching of the shutters is started to close the right eye shutter 13a.

When the scanning of the right eye n frame is completed and the video signal Vsync for the left eye m frame is subsequently inputted, the glasses unit with electronic shutters 13 is supplied with a High-level video synchronizing signal and a High-level glasses control signal from the display apparatus 11, so that control for closing the right eye shutter 13a and opening the left eye shutter 13b is performed. This allows the user to recognize the video signal for the left eye with the left eye. In addition, the glasses control signal becomes Low in the middle of the period for the left eye m frame, and switching of the shutters is started to close the left eye shutter 13b.

When the scanning of the left eye n frame is completed and the video signal Vsync for the right eye n+1 frame is subsequently inputted, the glasses unit with electronic shutters 13 is supplied again with a Low-level video synchronizing signal and a High-level glasses control signal from the display apparatus 11, so that the control for opening the right eye shutter 13a and closing the left eye shutter 13b is performed. This allows the user to recognize the video signal for the right eye with the right eye. In addition, the glasses control signal becomes Low in the middle of the period for the right eye n+1 frame, and switching of the shutters is started to close the right eye shutter 13a.

When the scanning of the right eye n+1 frame is completed and the video signal Vsync for the left eye m+1 frame is subsequently inputted, the glasses unit with electronic shutters 13 is supplied with a High-level video synchronizing signal and a High-level glasses control signal from the display apparatus 11, so that the control for closing the right eye shutter 13a and opening the left eye shutter 13b is performed. This allows the user to recognize the video signal for the left eye with the left eye. In addition, the glasses control signal becomes Low in the middle of the period for the left eye m+1 frame period, and switching of the shutters is started to close the left eye shutter 13b.

Figure 7:
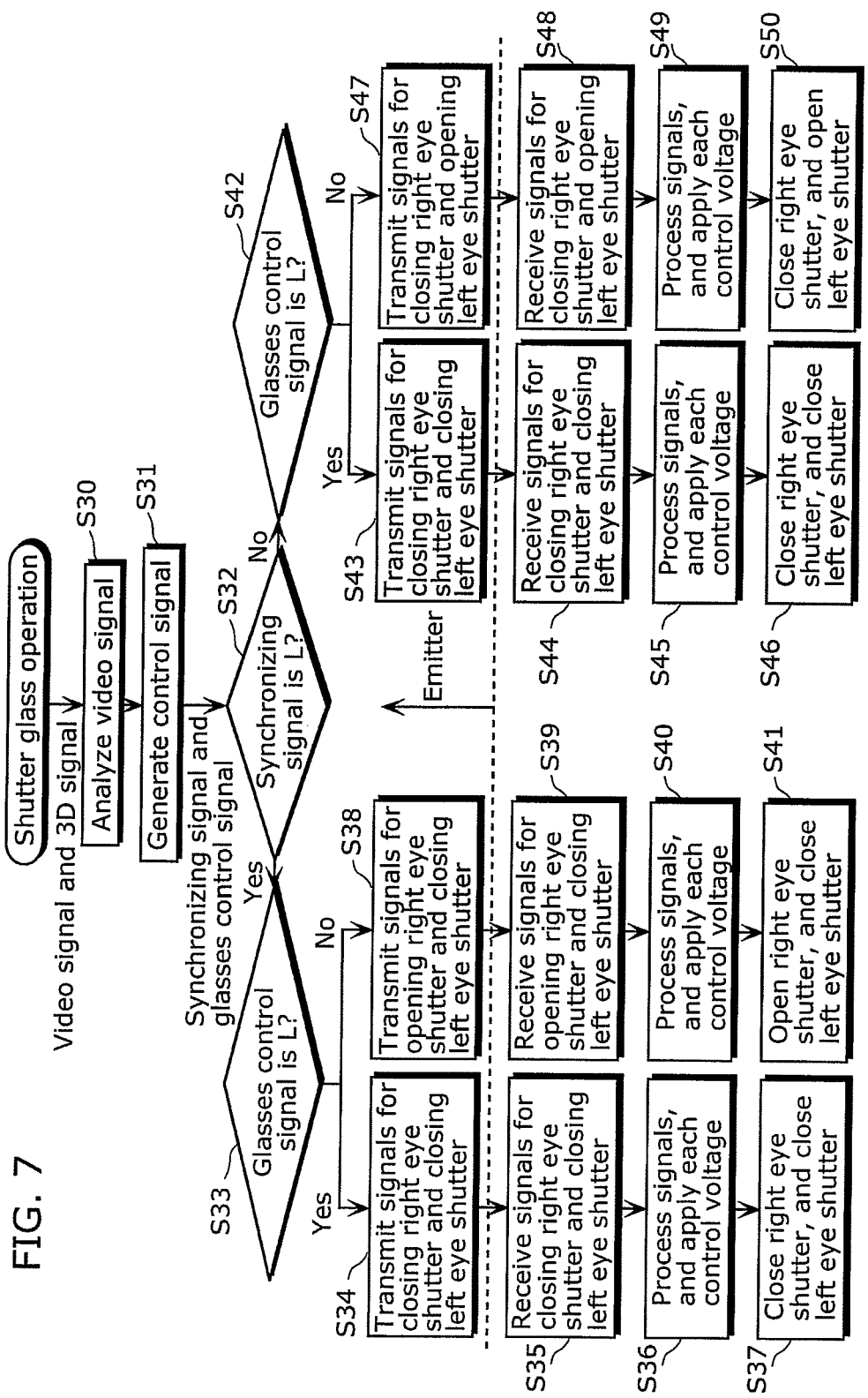
FIG. 7 is a flowchart showing an operation of the glasses unit with electronic shutters in FIG. 5.

FIG. 7 is a flowchart showing a flow of the shutter operation of the glasses unit with electronic shutters 13. First, the shutter operation is described taking the right eye n frame as an example.

As described above, after the operations in Steps S30 and S31 are performed in the display apparatus 11, the glasses synchronization control unit 31, which has received the video synchronizing signal and the glasses control signal from the signal processing unit 22, detects whether the received video synchronizing signal is Low (Step S32). In other words, the glasses synchronization control unit 31 detects whether the video displayed in the video display unit 20 is the video signal for the right eye. Then, when the video synchronizing signal is Low, the glasses synchronization control unit 31 further detects whether the glasses control signal is Low (Step S33).

When the video synchronizing signal is Low, and when at the same time the glasses control signal is not Low, the right eye shutter 13a is opened and the left eye shutter 13b is closed. In other words, the signal transmitting unit 32 transmits the video synchronizing signal and the glasses control signal to the signal receiving unit 35 (Step S38), and the signal receiving unit 35, which has received these signals, supplies these signals to the shutter switching unit 36 (Step S39). Then, the shutter switching unit 36 performs the control for opening the right eye shutter 13a and closing the left eye shutter (Step S40), so that the right eye shutter 13a opens and the left eye shutter 13b is closed. Note that the opening and closing of the shutters of the glasses unit with electronic shutters 13 is performed by, for example, the liquid crystal drive method, where the opening and closing of the shutters is performed through control of applied voltage. In addition, the method for driving the shutters is not limited to the liquid crystal drive method but may be another driving method.

In addition, when the video synchronizing signal is Low, and when at the same time the glasses control signal is Low, the right eye shutter 13a is closed and the left eye shutter 13b is closed. In other words, the signal transmitting unit 32 transmits the video synchronizing signal and the glasses control signal to the signal receiving unit 35 (Step S34), and the signal receiving unit 35, which has received these signals, supplies these signals to the shutter switching unit 36 (Step S35). Then, the shutter switching unit 36 performs control for closing the right eye shutter 13a and closing the left eye shutter 13b (Step S36), so that the right eye shutter 13a is closed and the left eye shutter 13b is closed (Step S37).

FIG. 9B is a diagram showing display video that is recognized by the viewer with the right eye when opening and closing the right eye shutter 13a of the glasses unit with electronic shutters 13, in the display video shown in FIG. 9A. Here, the period shown by hatching indicates a period of time from when the shutter starts closing to when the shutter is completely closed. With the above-described operation of the glasses unit with electronic shutters 13, the viewer recognizes the display video as shown in FIG. 9B. In other words, the right eye n frame and the right eye n+1 frame are opposite in the direction for scanning the video signal and the black signal, and likewise, the left eye m frame and the left eye m+1 frame are opposite in the direction for scanning the video signal and the black signal.

The glasses control signal is a control signal which closes one of the right eye shutter 13a and the left eye shutter 13b for a predetermined period of time from when the video synchronizing signal is started, and which starts closing the right eye shutter 13a or the left eye shutter 13b that has been open before the next video synchronizing signal is started, by considering the response time in opening and closing of the shutters. Thus, as shown in FIG. 9B, since the closing of the right eye shutter 13a is started in the middle of the right eye n frame, a few lines in the lower side of the display image in the right eye n frame and a few lines in the upper side of the display image in the right eye n+1 frame are shielded by the right eye shutter 13a. Thus, the viewer recognizes that the few lines in each of the lower and upper sides of the video display unit 20 appear darkened. In other words, compared to the conventional technique with which the few lines in the lower side of the video display unit 20 are always recognized as darkened, the darkened part is dispersed into the few lines in each of the upper and lower sides of the video display unit 20, and at the same time, the intensity of darkness is suppressed to almost half as compared to the intensity of darkness in the conventional technique. Thus, luminance unevenness, which is felt by the viewer as darkening, can be suppressed.

Next, the left eye m frame in FIG. 4 is described as an example.

The glasses synchronization control unit 31, which has received a video synchronizing signal to which the glasses control signal is appended, detects whether the received video synchronizing signal is Low (Step S32). In other words, the glasses synchronization control unit 31 detects whether the video displayed in the video display unit 20 is the video signal for the right eye. Then, when the video synchronizing signal is not Low, that is, when the video displayed in the video display unit 20 is the video signal for the left eye, the glasses synchronization control unit 31 further detects whether the glasses control signal is Low (Step S42).

When the video synchronizing signal is High, and when at the same time the glasses control signal is not Low, the left eye shutter 13b is opened and the right eye shutter 13a is closed. In other words, the signal transmitting unit 32 transmits the video synchronizing signal and the glasses control signal to the signal receiving unit 35 (Step S47), and the signal receiving unit 35, which has received these signals, supplies these signals to the shutter switching unit 36 (Step S48). Then, the shutter switching unit 36 performs control for opening the left eye shutter 13b and closing the right eye shutter 13a (Step S49), so that the left eye shutter 13b opens and the right eye shutter 13a is closed (Step S50).

In addition, when the video synchronizing signal is High, and when at the same time the glasses control signal is Low, the left eye shutter 13b is closed and the right eye shutter 13a is closed. In other words, the signal transmitting unit 32 transmits the video synchronizing signal and the glasses control signal to the signal receiving unit 35 (Step S43), and the signal receiving unit 35, which has received these signals, supplies these signals to the shutter switching unit 36 (Step S44). Then, the shutter switching unit 36 performs control for closing the left eye shutter 13b and closing the right eye shutter 13a (Step S45), so that the left eye shutter 13b is closed and the right eye shutter 13a is closed (Step S46).

FIG. 10 is a diagram showing display video that the viewer recognizes with the right eye, left eye, and both eyes, respectively, when opening and closing the right eye shutter 13a and the left eye shutter 13b of the glasses unit with electronic shutters 13. Here, the glasses control signal is a control signal which opens one of the right eye shutter 13a and the left eye shutter 13b for a predetermined period of time from when the video synchronizing signal is started, and which closes the right eye shutter 13a or the left eye shutter 13b that has been open after a lapse of a predetermined period. Thus, as shown in the diagram at the bottom in FIG. 10, a shutter closing period in which both shutters are closed is generated while the video synchronizing signal is switching the opening and closing of the shutters from the right eye shutter 13a to the left eye shutter 13b, or while switching the opening and closing of the shutters from the left eye shutter 13b to the right eye shutter 13a.

Note that in FIG. 5, in the case where the display control signal does not include a 3D signal, the shutter glass operation described above is not performed (Step S16), and normal scanning control for displaying planer video is performed (Steps S17 and S15).

Figure 8:
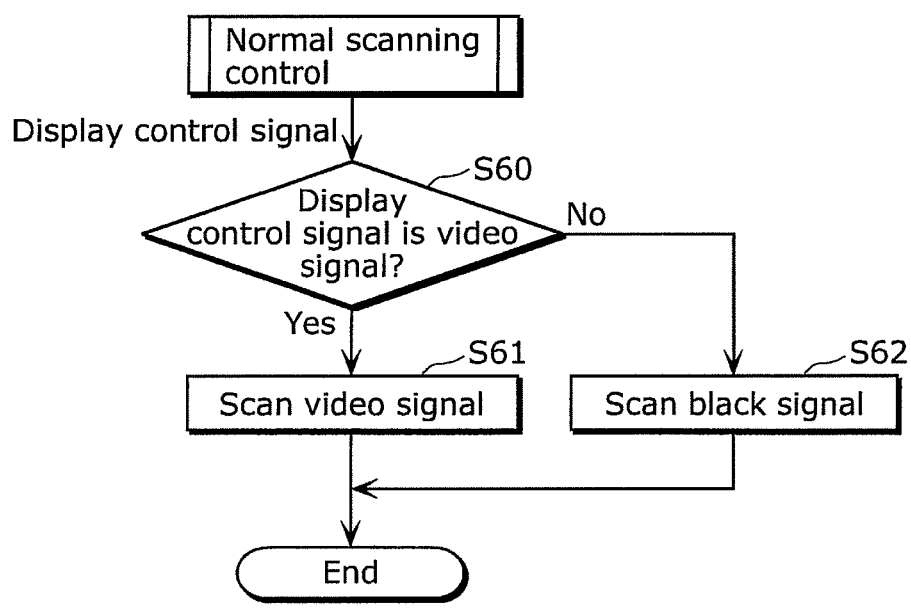
FIG. 8 is a flowchart showing processing for normal scanning control in FIG. 5.

FIG. 8 is a flowchart showing processing for the normal scanning control. The drive signal control unit 23, which has received a display control signal which does not include a 3D signal, detects whether the display control signal is a video signal Vsync (Step S60). Then, when detecting that the display control signal is the video signal Vsync, the drive signal control unit 23 performs control for scanning the video signal Vsync as planer video (Step S61). In addition, the drive signal control unit 23 performs control for scanning the black signal when detecting that the display control signal is not the video signal Vsync, that is, when detecting that the display control signal is the black signal (Step S62). This allows the viewer to recognize the video signal as planer video.

Second Embodiment

Next, a video display system according to a second embodiment of the present invention is described.

The present embodiment differs from the first embodiment only in that the black signal is supplied only during a shutter closing period in which both the right eye shutter 13a and the left eye shutter 13b are closed.

Figure 11:
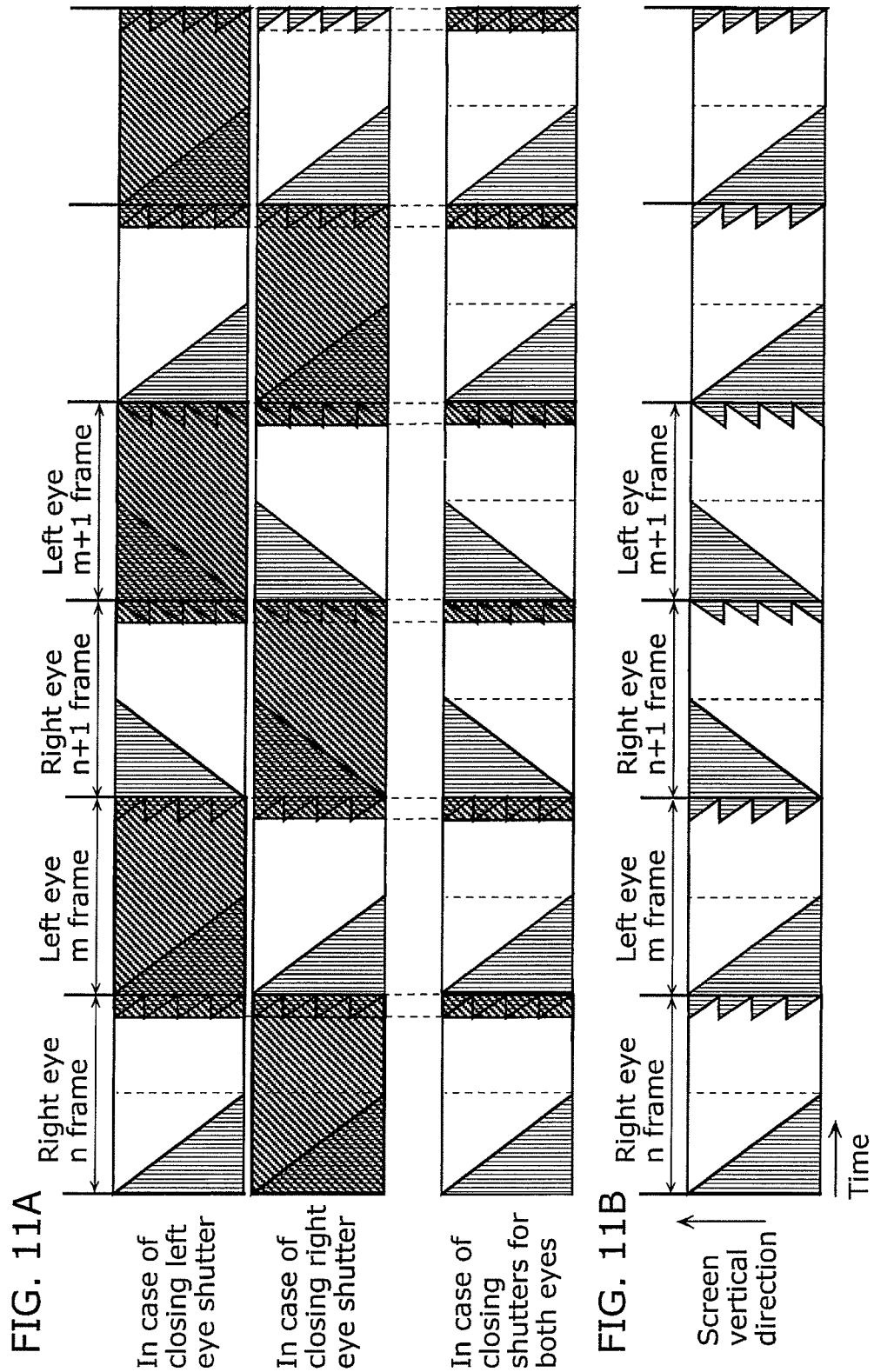
FIG. 11A is a diagram showing display video when opening and closing the shutters of the glasses unit with electronic shutters in the video display system according to a second embodiment of the present invention.
FIG. 11B is a diagram showing the display video shown in FIG. 11A.

FIG. 11A is a diagram showing display video that is recognized by the viewer with the right eye, left eye, and both eyes, respectively, when opening and closing the right eye shutter 13a and the left eye shutter 13b of the glasses unit with electronic shutters 13 according to the present embodiment.

As shown in FIG. 11A, due to the response time in opening and closing of the shutters, the shutter closing period in which both of the shutters are closed is provided while the video synchronizing signal is switching the opening and closing of the shutters from the right eye shutter 13a to the left eye shutter 13b, or while switching the opening and closing of the shutters from the left eye shutter 13b to the right eye shutter 13a. Thus, by continuously supplying a video signal until the shutter closing period starts and then inserting a black signal during the shutter closing period, it is possible to efficiently suppress luminance unevenness in the upper and lower sides of the video display unit.

FIG. 11B is a diagram showing display video with a shutter removed from FIG. 11A. Since the video display unit 20 displays the black signal only during the shutter closing period, it is necessary to reduce the display time. Thus, as shown in FIG. 10, when serially supplying a control signal to the gate lines Hy in the video display unit 20 in order starting from the head line H1 to the final line Hy, the display time for the black signal becomes longer to exceed the shutter closing period. Thus, as shown in FIG. 11B, for example, the video display unit 20 is segmented into four screen areas, and the black signal is scanned on each of the screen areas during the shutter closing period. Note that the scan reverse control performed in the present embodiment is referred to as scan-reverse black simultaneous scanning control. Note that the number of segmentation for segmenting the video display unit 20 as described above is not limited to four but may be another number that is larger than one.

Figure 12:
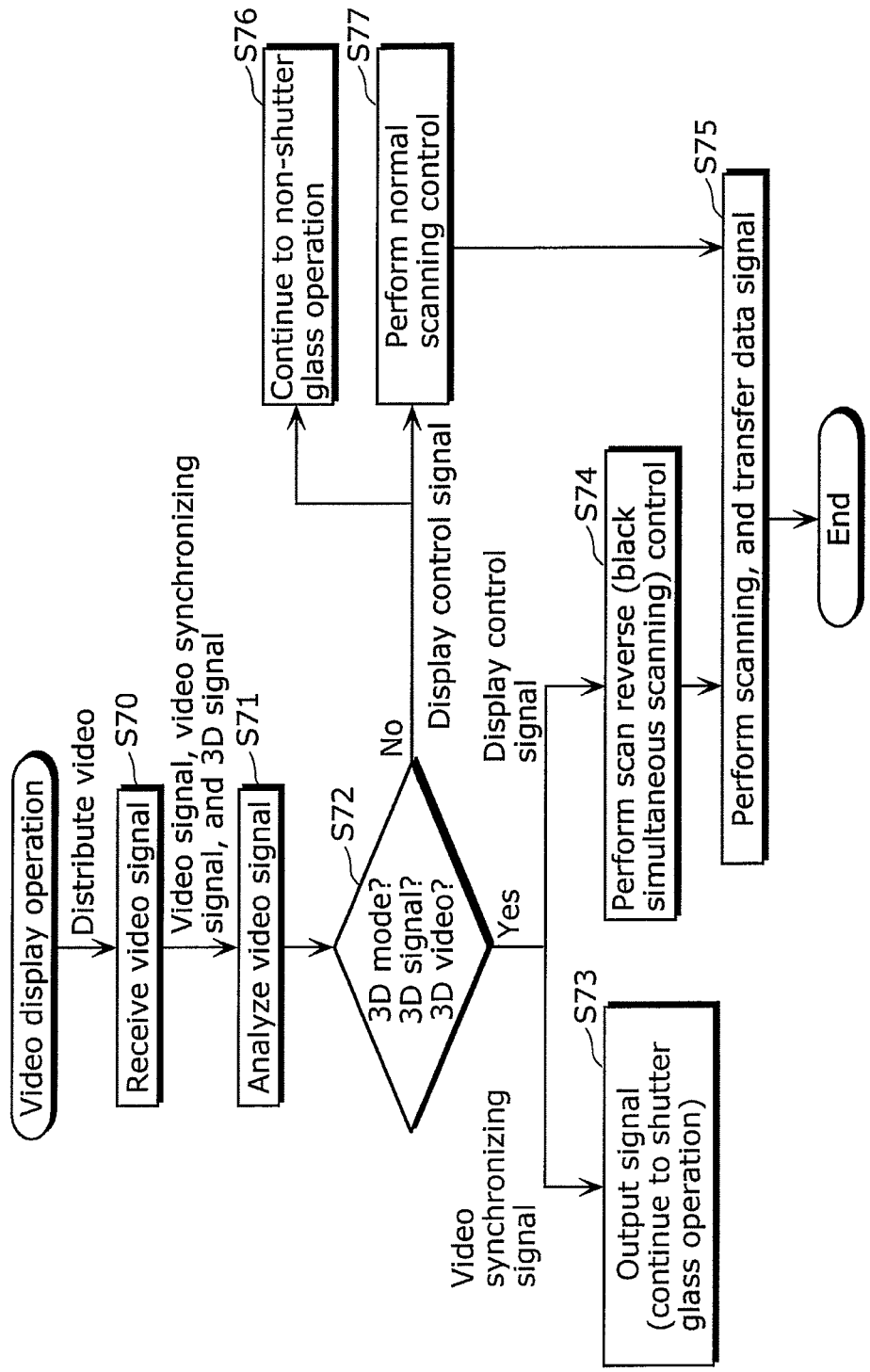
FIG. 12 is a flowchart showing an operation of the video display system in the second embodiment.

FIG. 12 is a flowchart showing processing for scan-reverse black simultaneous scanning control in FIG. 5. As in the first embodiment, the video signal Vsync for the right eye n frame, which is outputted by the video signal output unit 12, is received by the signal input unit 21 in the display apparatus 11 (Step S70). To this video signal Vsync, the video synchronizing signal and a 3D signal including information regarding stereoscopic video are appended. Note that the 3D signal is not appended to a video signal Vsync that is not for stereoscopic video. Then, the signal input unit 21, which has received the video signal Vsync, supplies the video signal Vsync to the signal processing unit 22.

The signal processing unit 22 analyses the supplied video signal Vsync (Step S71), and separates the video synchronizing signal and the 3D signal from the video signal Vsync. Then, the signal processing unit 22 detects whether the 3D signal is appended to the video signal Vsync (Step S72), generates a display control signal which is a control signal for performing a stereoscopic display or a flat display of the video signal, and outputs the display control signal to the drive signal control unit 23. Note that the display control signal includes the scanning signal, and the video signal Vsync or the black signal which have been described above. Here, in the case where the 3D signal is appended to the video signal Vsync, the signal processing unit 22 further separates the first frame image information and the second frame image information from the video signal Vsync.

In addition, in the case where the 3D signal is appended to the video signal Vsync, the signal processing unit 22 generates a video synchronizing signal indicating timing of switching between the first frame and the second frame, and outputs the video synchronizing signal to the glasses unit with electronic shutters 13 via the signal transmitting unit 24. Then, the glasses unit with electronic shutters 13, which has received the video synchronizing signal, performs a shutter glass operation (Step S73).

Then, the drive signal control unit 23 performs scan reverse control according to the display control signal (Step S74).

Figure 13:
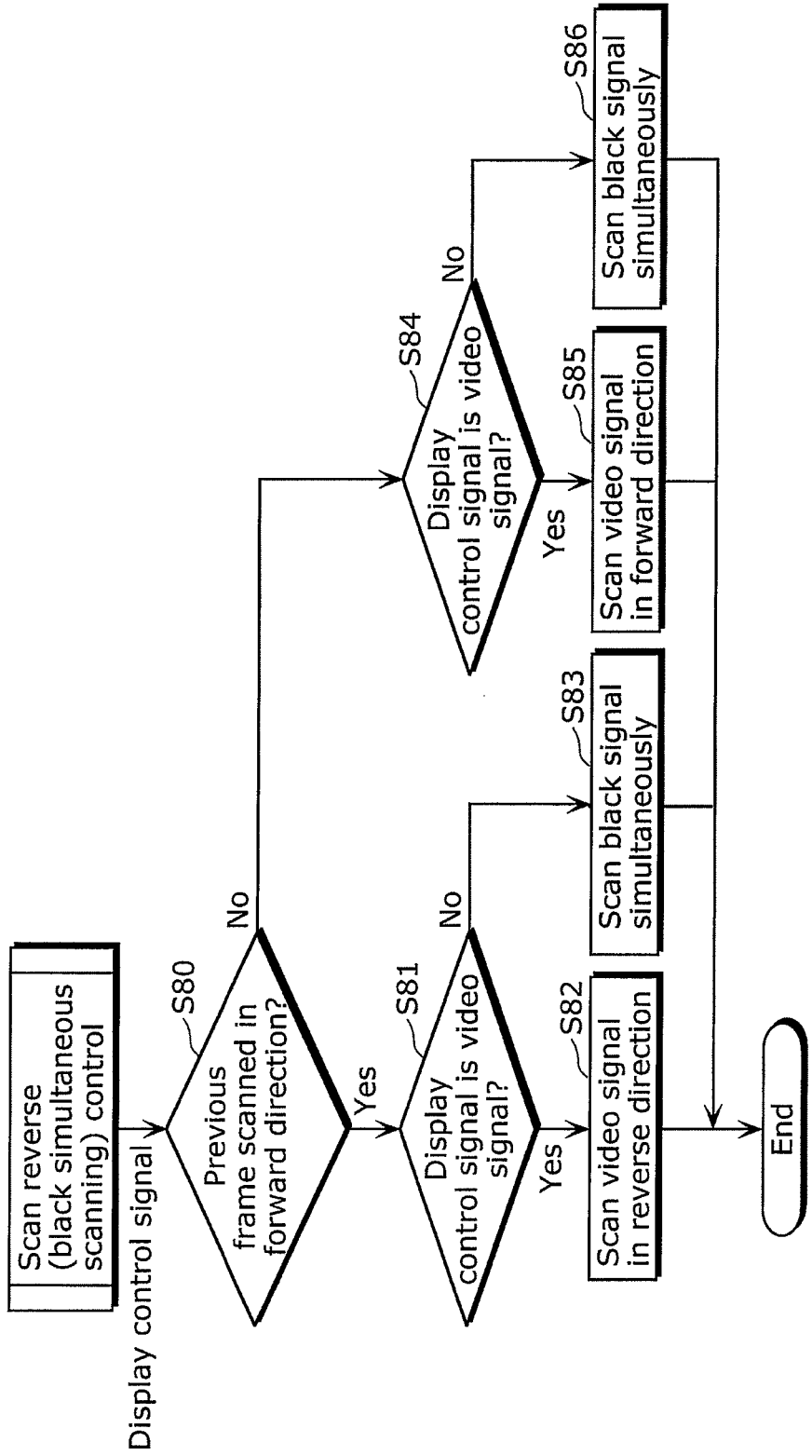
FIG. 13 is a flowchart showing processing for reverse scan black simultaneous scanning control in FIG. 12.

FIG. 13 is a flowchart showing processing for the scan-reverse black simultaneous scanning control. Here, the right eye n+1 frame shown in FIG. 11B is described as an example. The drive signal control unit 23, which has received the display control signal, detects whether the left eye m frame that is a previous frame has been scanned in a forward direction, that is, from the head line H1 in the upper side of the video display unit 20 toward the final line Hy in the lower side (Step S80). Then, when detecting that the left eye m frame has been scanned in the forward direction, the drive signal control unit 23 further detects whether the display control signal is a video signal Vsync (Step S81).

Then, when detecting that the display control signal is the video signal Vsync, the drive signal control unit 23 performs control for scanning the video signal Vsync in a reverse direction (Step S82). In other words, the drive signal control unit 23 supplies a scanning signal to the scanning signal transfer unit 25 such that scanning is performed at the same speed as in the scanning of the video signal Vsync for the left eye m frame and in the direction reverse to the scanning direction for the left eye m frame, that is, from the final line Hy in the lower side of the video display unit 20 toward the head line H1 in the upper side. With this, the scanning signal transfer unit 25 outputs the scanning signal to the video display unit 20 via the gate line Hy. In addition, the data signal transfer unit 26 serially outputs, to each data line Vx, a video signal Vsync corresponding to each line, in order starting from the final line Hy in the lower side to the head line H1 in the upper side (Step S75).

In addition, the drive signal control unit 23 performs control for scanning the black signal in the reverse direction when detecting that the display control signal is not the video signal Vsync, that is, when detecting that the display control signal is the black signal (Step S83). In other words, the drive signal control unit 23 supplies the scanning signal to the scanning signal transfer unit 25 as described above such that the four screen areas are simultaneously scanned, starting from the final line to the head line in each of the four screen areas in synchronization with the shutter closing period. With this, the scanning signal transfer unit 25 serially outputs the scanning signal to the video display unit 20 via each gate line Hy, in the direction from the final line to the head line in each of the four screen areas. In addition, the data signal transfer unit 26 serially outputs the black signal to each data line Vx in order starting from the final line in the lower side to the head line in the upper side in each of the screen areas (Step S75). Note that the black signal is not supplied to the final line Hy when there is no time interval between when the supply of the video signal Vsync which corresponds to the left eye m frame and which is to be supplied to the final line Hy is completed to when the supply of the video signal which corresponds to the right eye n+1 frame and which is to be supplied to the final line Hy is started, and the video signal Vsync for the right eye n+1 frame is supplied following the video signal Vsync for the left eye m frame.

In addition, on the left eye m+1 frame making up the same picture, the control for scanning in the reverse direction is also performed in the same manner as in the scanning of the right eye n+1 frame as described above.

Next, an example of the right eye n frame shown in FIG. 11B is described. The drive signal control unit 23, which has received the display control signal, detects whether the left eye m−1 frame that is a previous frame has been scanned in the forward direction (Step S80). Then, when detecting that the left eye m−1 frame has not been scanned in the forward direction, the drive signal control unit 23 further detects whether the display control signal is a video signal Vsync (Step S84).

Then, when detecting that the display control signal is the video signal Vsync, the drive signal control unit 23 performs control for scanning the video signal Vsync in the forward direction (Step S85). In other words, the drive signal control unit 23 supplies a scanning signal such that the scanning is performed, starting from the head line H1 in the upper side of the video display unit 20 toward the final line Hy in the lower side. With this, the scanning signal transfer unit 25 outputs the scanning signal to the video display unit 20 via the gate line Hy. In addition, the data signal transfer unit 26 outputs, to each data line Vx, a video signal Vsync corresponding to each line, in order starting from the head line H1 in the upper side to the final line Hy in the lower side (Step S75).

In addition, the drive signal control unit 23 performs control for scanning the black signal in the forward direction when detecting that the display control signal is not the video signal Vsync, that is, when detecting that the display control signal is the black signal (Step S86). In other words, the drive signal control unit 23 supplies the scanning signal to the scanning signal transfer unit 25 such that the four screen areas are simultaneously scanned, in the direction from the head line to the final line in each of the four screen areas, in synchronization with the shutter closing period. With this, the scanning signal transfer unit 25 outputs the scanning signal to the video display unit 20 via each gate line Hy, in the direction from the head line to the final line in each of the screen areas. In addition, the data signal transfer unit 26 serially outputs the black signal to each data line Vx, in order starting from the head line in the upper side to the final line in the lower side in each of the screen areas (Step S75).

In addition, on the left eye m frame making up the same picture, the control for scanning in the forward direction is also performed in the same manner as in the scanning of the right eye n frame as described above.

Note that the shutter glass operation of the glasses unit with electronic shutters 13 and the normal scanning operation are the same as those in the first embodiment described above, and therefore the description thereof is omitted.

As a result of the scanning described above, as shown in FIG. 11B, for the video displayed in the video display unit 20, the video signal is displayed until the shutter closing period starts and the black signal is displayed during the shutter closing period in each frame. In addition, the right eye n frame and the right eye n+1 frame are opposite in the direction for scanning the video signal and the black signal, and likewise, the left eye m frame and the left eye m+1 frame are opposite in the direction for scanning the video signal and the black signal.

With this configuration, it is possible to reduce the time for supplying the black signal and use the time thus saved for causing the video signal to produce luminescence, thus allowing the video display unit 20 to produce luminescence for a longer time. As a result, it is possible to increase the luminance of the entire display unit 20, thus allowing suppressing luminance unevenness generated in the upper and lower sides of the video display unit 20. Note that in the case where the display control signal does not include a 3D signal, the shutter glass operation described above is not performed (Step S76), and normal scanning control for displaying planer video is performed (Steps S77 and S75).

Figure 14:
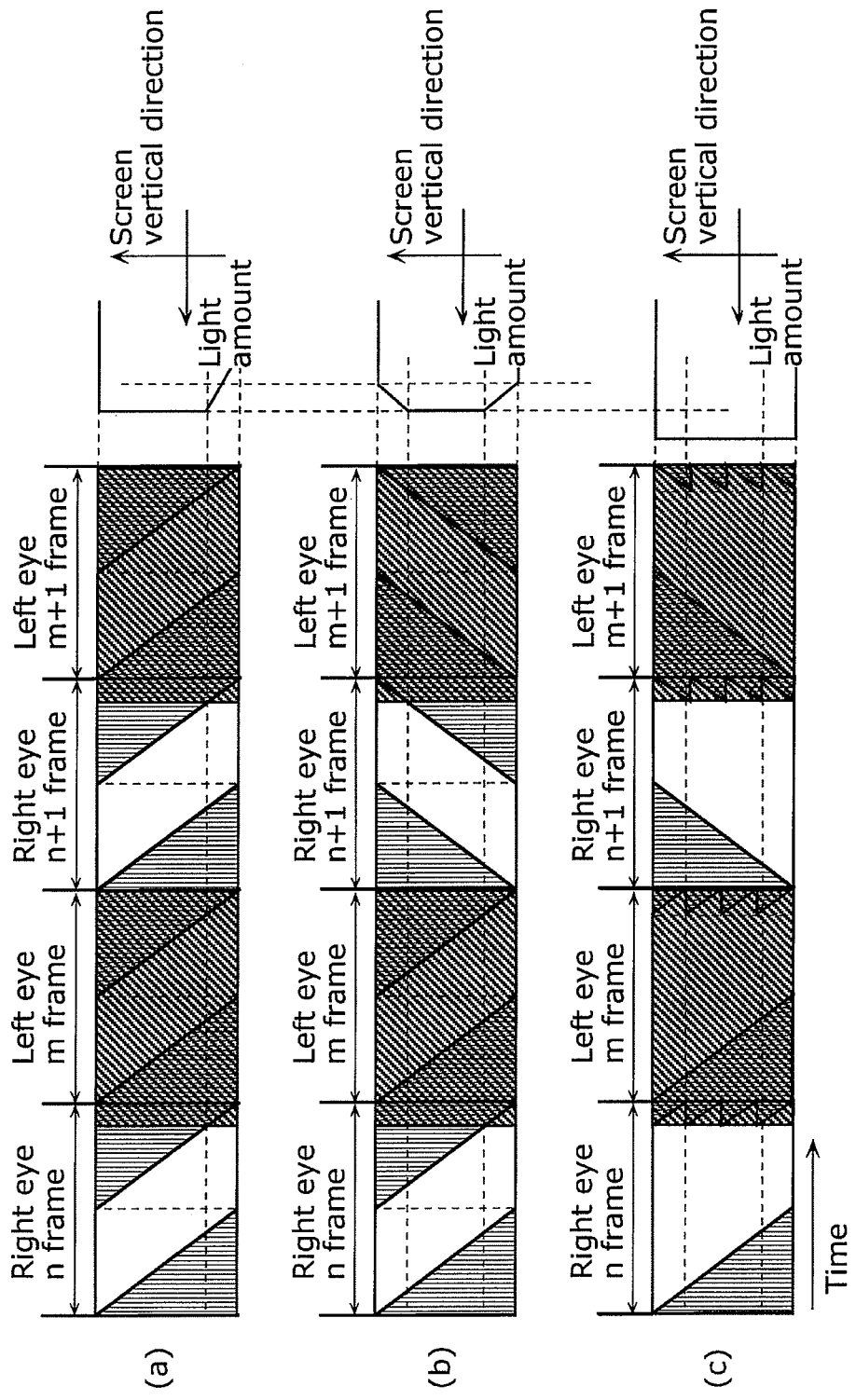
FIG. 14(a) to (c) is a diagram showing luminance of display video, with (a) showing the luminance of the display video in a conventional technique, (b) showing the luminance of the display video in the first embodiment, and (c) showing the luminance of the display in the second embodiment.

FIG. 14 are diagrams showing luminance of the display video in the conventional technique, the first embodiment, and the second embodiment, with FIG. 14(a) showing the luminance of the display video in a conventional technique, FIG. 14(b) showing the luminance of the display video in the first embodiment, and FIG. 14(c) showing the luminance of the display video in the second embodiment. Here, the vertical axis indicates a vertical direction of the screen and the horizontal axis indicates a light amount. The light amount indicated by the horizontal axis indicates higher luminance as moving leftward along the arrow. In FIG. 14, when comparing the light amount that is combined light amounts for the first picture made up of the right eye n frame and the left eye m frame and for the second picture made up of the right eye n+1 frame and the left eye m+1 frame, the luminance of the display video in the conventional technique, as shown in FIG. 14(a), is low only in the video in the lower side of the video display unit 20. In addition, as shown in FIG. 14(b), the luminance of the display video in the first embodiment is evenly low in the upper and lower sides of the video display unit 20. For the luminance at this time, the intensity of darkness is suppressed to almost half as compared to the luminance of the display video in the conventional technique shown in FIG. 14(a). Furthermore, as shown in FIG. 14(c), the luminance of the display video in the second embodiment becomes higher in the entire video display unit 20 than the luminance of the display video in the conventional technique shown in FIG. 14(a) and the first embodiment in FIG. 14(b). Accordingly, the luminance unevenness in the upper and lower sides of the video display unit 20 can be further reduced.

(Variation)

Next, a video display system according to a variation of the present invention is described.

The present variation is different from the first embodiment in that a video display unit 50 according to the present variation is segmented into plural screen areas in a vertical direction of the video display unit 50, and that a drive signal control unit 53 in a display apparatus 41 supplies a video signal corresponding to each of the screen areas resulted from the segmentation.

FIG. 15A and FIG. 15B are diagrams each showing an example of the display video in the present variation. In addition, FIG. 16 is a block diagram showing a configuration of the display apparatus 14 according to the present variation.

As shown in FIG. 15A, in the present variation, the drive signal control unit 53 segments, for the same frame, a screen on which the video is displayed by the video display unit 20 into two upper and lower screen areas, so as to control the two upper and lower screen areas. In other words, the drive signal control unit 53 simultaneously supplies, in the same line direction, video signals corresponding, respectively, to the two upper and lower screen areas making up the same frame. Here, the line direction means a direction from the head line to the final line among the gate lines Hy, or a direction from the final line to the head line.

The configuration of the display apparatus 41 for performing such control is described.

Figure 16:
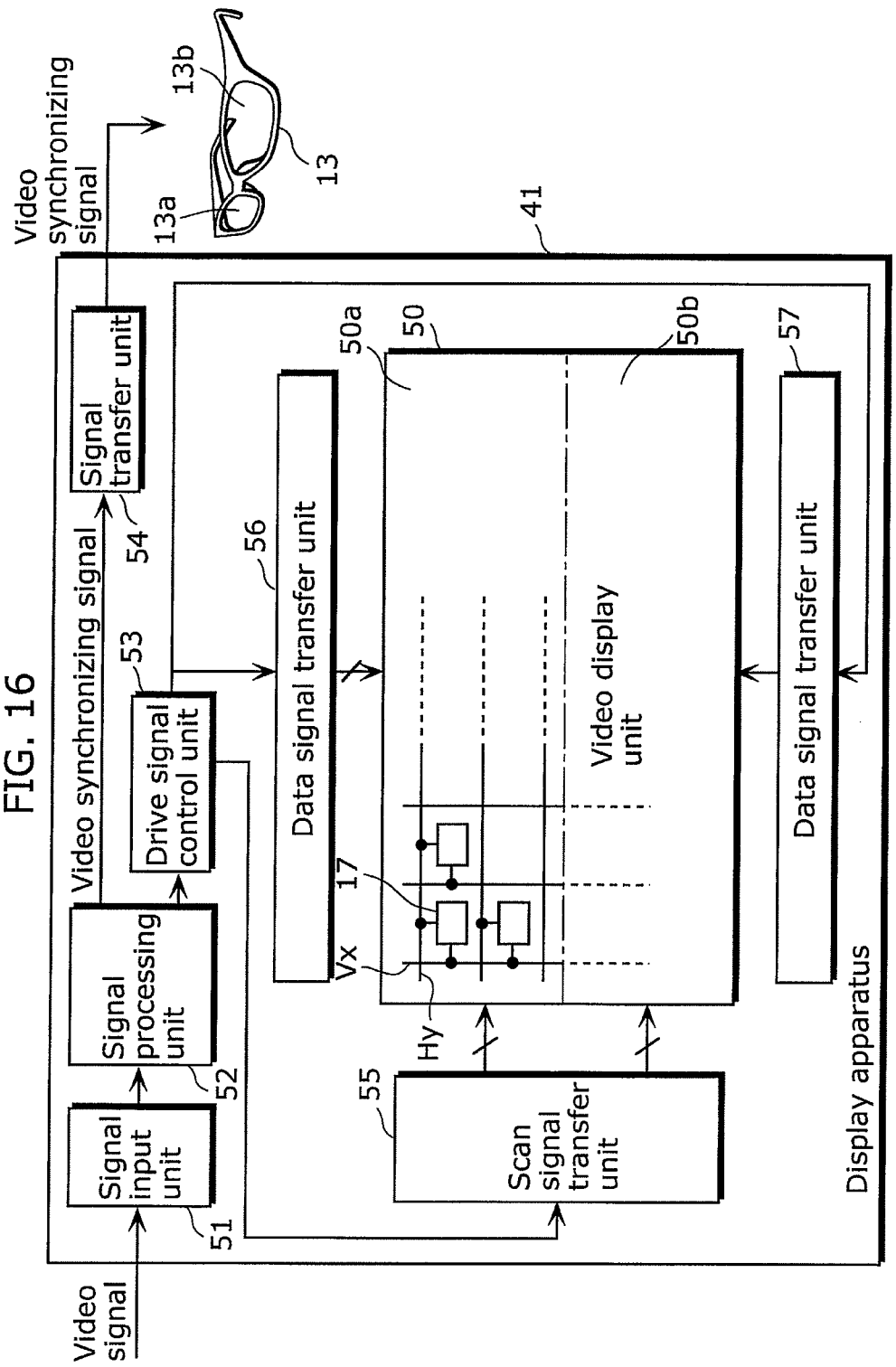
FIG. 16 is a block diagram showing a configuration of a display apparatus according to the variation.
Figure 19:
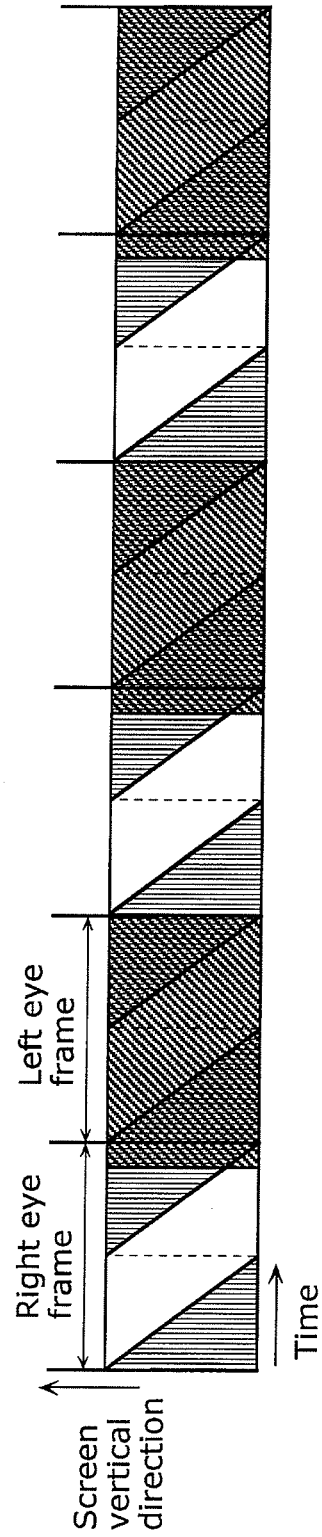
FIG. 19 is a diagram showing an example of the conventional display video.
Figure 20:
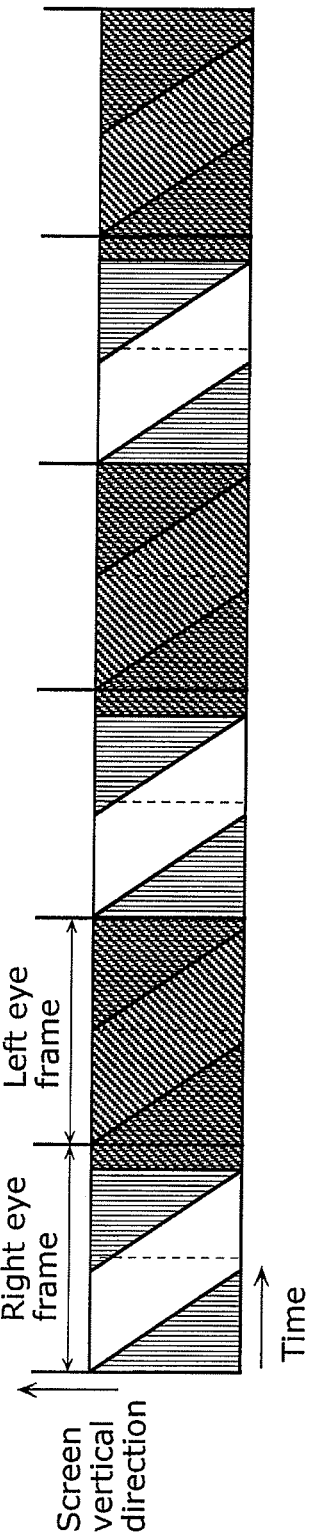
FIG. 20 is a diagram showing an example of the conventional display video.

In addition, FIG. 16 is a block diagram showing a configuration of the display apparatus 14 according to the present variation. As shown in FIG. 16, the display apparatus 41 includes: a video display unit 50, a signal input unit 51, a signal processing unit 52, a drive signal control unit 53, a signal transmitting unit 54, a scanning signal transfer unit 55, and data signal transfer units 56 and 57. Note that the video display unit 50, the signal input unit 51, the signal processing unit 52, the drive signal control unit 53, the scanning signal transfer unit 55, and the data signal transfer unit 56 and 57 correspond, respectively, to: the display unit, the input unit, the signal processing unit, the first control unit, the scanning line drive circuit, and the data line drive circuit in the present invention.

The video display unit 50 includes: a first screen area 50a that is the upper screen area, and a second screen area 50b that is the lower screen area. The first screen area 50a is supplied with a scanning signal via the gate line H1 to Ha, and the second screen area 50b is supplied with a scanning signal via the gate line Ha+1 to Hy.

The drive signal control unit 53 generates scanning signals for driving the scanning signal transfer unit 55 in response to the video signals for the first frame and the second frame that have been inputted from the signal processing unit 52 into the scanning signal transfer unit 55. At this time, in the first screen area 50a and the second screen area 50b in the same frame, the drive signal control unit 53 generates scanning signals such that scanning is simultaneously performed in the same direction, and supplies the generated scanning signals to the scanning signal transfer unit 55.

For example, when displaying, in the video display unit 50, a video signal corresponding to the right eye n frame as shown in FIG. 15A, the drive signal control unit 53 supplies video signals which correspond, respectively, to the first screen area 50a and the second screen area 50b, and scanning signals each for performing scanning in the direction from the head line to the final line in the video display unit 50.

In addition, the scanning signal transfer unit 55 supplies a scanning signal for driving the first screen area 50a to the gate lines from H1 to Ha, and outputs a scanning signal for driving the second screen area 50b to the gate lines from Ha+1 to Hy. Specifically, the scanning signal transfer unit 55 simultaneously outputs scanning signals to the total two gate lines, that is, the head line H1 in the first screen area 50a and the head line Ha+1 in the second screen area 50b, and likewise simultaneously and serially outputs the scanning signals in order, to the final line Ha in the first screen area 50a and to the lines in the second screen area 50b up to the final line Hy.

The drive signal control unit 53 supplies, from among the video signals which have been inputted from the signal processing unit 52 and which are for the same frame, a video signal corresponding to the first screen area 50a to the data signal transfer unit 56, and a video signal corresponding to the second screen area 50b to the data signal transfer unit 57. The data signal transfer unit 56 supplies, to each data line Vx, a video signal Vsync for each line that is to be supplied with the scanning signal, in order starting from the head line H1 to the final line Ha in the first screen area 50a. Likewise, the data signal transfer unit 57 supplies, to each data line Vx, a video signal Vsync for each line that is to be supplied with the scanning signal, in order starting from the head line Ha to the final line Hy in the second screen area 50b.

In addition, the same control is performed on the left eye m frame.

Furthermore, when displaying in the video display unit 50, a video signal corresponding to the right eye n+1 frame as shown in FIG. 15A, the drive signal control unit 53 supplies video signals which correspond, respectively, to the first screen area 50a and the second screen area 50b, and scanning signals each for performing scanning in the direction from the final line to the head line in the video display unit 50.

In addition, the scanning signal transfer unit 55 supplies a scanning signal for driving the first screen area 50a to the gate lines from Ha to H1, and outputs a scanning signal for driving the second screen area 50b to the gate lines from Hy to Ha+1. Specifically, the scanning signal transfer unit 55 simultaneously outputs the scanning signals to the total two gate lines, that is, the final line Ha in the first screen area 50a and the final line Hy in the second screen area 50*b*, and likewise simultaneously and serially outputs the scanning signals in order, to the head line H1 in the first screen area 50*a* and to the lines in the second screen area 50*b* up to the final line Ha+1.

The drive signal control unit 53 supplies, from among video signals which have been inputted from the signal processing unit and which are for the same frame, the video signal corresponding to the first screen area 50*a* to the data signal transfer unit 56, and the video signal corresponding to the second screen area 50*b* to the data signal transfer unit 57. The data signal transfer unit 56 supplies, to each data line Vx, a video signal Vsync for each line that is to be supplied with the scanning signal, in order starting from the final line Ha to the head line H1 in the first screen area 50*a*. Likewise, the data signal transfer unit 57 supplies, to each data line Vx, a video signal Vsync for each line that is to be supplied with the scanning signal, in order starting from the final line Hy to the head line Ha in the second screen area 50*b*.

In addition, the same control is performed on the left eye m+1 frame.

With such a configuration, it is possible to suppress luminance unevenness generated in the upper and lower sides of the video display unit 50 and also to simultaneously supply, for the same frame, video signals which correspond, respectively, to the first screen area 50*a* and the second screen area 50*b*, thus allowing significantly reducing the time for supplying video signals as compared to the case of supplying the video signals without segmenting the video display unit into plural screen areas.

In addition, FIG. 15B is a diagram showing another example of display video in the present variation. As the figure shows, the drive signal control unit 53 may generate scanning signals for simultaneously scanning, in a reverse line direction, video signals that are to be displayed in the first screen area 50*a* and the second screen area 50*b* in the first frame, and may provide the generated scanning signals to the scanning signal transfer unit 55.

For example, when displaying, in the video display unit 50, a video signal corresponding to the right eye n frame as shown in FIG. 15B, the scanning signal transfer unit 55, supplied with the scanning signals from the drive signal control unit 53, simultaneously outputs the scanning signals to the total two lines, that is, the head line H1 in the first screen area 50*a* and the final line Hy in the second screen area 50*b*, and likewise simultaneously and serially outputs the scanning signals in order, to the final line Ha in the first screen area 50*a* and to the lines in the second screen area 50*b* up to the head line Ha+1.

At this time, the drive signal control unit 53 supplies, from among video signals which have been inputted from the signal processing unit 52 and which are for the same frame, the video signal corresponding to the first screen area 50*a* to the data signal transfer unit 56, and the video signal corresponding to the second screen area 50*b* to the data signal transfer unit 57. The data signal transfer unit 56 supplies, to each data line Vx, a video signal Vsync for each line that is to be supplied with the scanning signal, in order from the head line H1 to the final line Ha in the first screen area 50*a*. Likewise, the data signal transfer unit 57 supplies, to each data line Vx, a video signal Vsync for each line that is to be supplied with the scanning signal, in order from the final line Hy to the head line Ha+1 in the second screen area 50*b*.

In addition, the same control is performed on the left eye m frame.

In addition, when displaying in the video display unit 50, a video signal corresponding to the right eye n+1 frame, the scanning signal transfer unit 55, supplied with the scanning signals from the drive signal control unit 53, simultaneously outputs the scanning signals to the total two lines, that is, the final line Ha in the first screen area 50*a* and the head line Ha+1 in the second screen area 50*b*, and likewise simultaneously and serially outputs the scanning signals in order, to the head line H1 in the first screen area 50*a* and to the lines in the second screen area 50*b* up to the final line Hy.

At this time, the drive signal control unit 53 supplies, from among the video signals which have been inputted from the signal processing unit 52 and which are for the same frame, the video signal corresponding to the first screen area 50*a* to the data signal transfer unit 56, and the video signal corresponding to the second screen area 50*b* to the data signal transfer unit 57. The data signal transfer unit 56 supplies, to each data line Vx, a video signal Vsync for each line that is to be supplied with the scanning signal, in order starting from the final line Ha to the head line H1 in the first screen area 50*a*. Likewise, the data signal transfer unit 57 supplies, to each data line Vx, a video signal Vsync for each line that is to be supplied with the scanning signal, in order starting from the final line Hy to the head line Ha+1 in the second screen area 50*b*.

In addition, the same control is performed on the left eye m+1 frame.

With such a configuration, it is possible to suppress luminance unevenness generated in the upper and lower sides of the video display unit 50 and also to simultaneously supply, for the same frame, video signals which correspond, respectively, to the first screen area 50*a* and the second screen area 50*b*, thus allowing significantly reducing the time for supplying video signals as compared to the case of supplying the video signals without segmenting the video display unit into plural screen areas.

Note that in the present variation the video display unit 50 has been segmented into two, that is, the first screen area 50*a* and the second screen area 50, but the video display unit 50 may be separated into a larger number of screen areas.

Note that the present invention is not limited to the embodiments described above and various variations and modifications are possible without departing from the spirit or scope of the present invention.

For example, the emitter in the glasses unit with electronic shutters may be an external emitter provided outside the main body of the glasses unit with electronic shutters. In addition, the emitter may be embedded in the display apparatus. In addition, the external emitter may have a configuration that allows signal transmission between the emitter and the glasses unit with electronic shutters using, for example, infrared rays, instead of being connected, with wiring, to the glasses unit with electronic shutters.

In addition, in the scan-reverse black simultaneous scanning control in one of the embodiments described above, the video display unit has been segmented into four screen areas and the black signal has been scanned on each of the screen areas during the shutter closing period, but the number of the screen areas to be obtained from segmenting the video display unit is not limited to four but may be another number that is larger than one.

In addition, in one of the embodiments described above, the video display unit has been segmented into two screen areas, that is, the first screen area and the second screen area, but the video display unit may be segmented into a larger number of screen areas.

In addition, in the second embodiment, the display unit may also be segmented into plural screen areas so as to be controlled as described above.

In addition, in the embodiments described above, a video display system including an organic EL flat panel display has been described as an example, but in the present invention, not only the organic EL flat panel display but also a video display system including a liquid crystal display or a display apparatus of another method may also be used.

In addition, the method for driving the shutters of the glasses unit with electronic shutters is not limited to the liquid crystal drive method but may be another driving method.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The video display system, the video display method, and the display apparatus according to the present invention are applicable to a display used for displaying stereoscopic video, and are particularly useful for a hold-type organic EL flat panel display.

What is claimed is:

1. A video display system, comprising:
a displayer, including:
   a display that includes pixels arranged in lines;
   a scanning signal transferor configured to supply scanning signals to the pixels for driving the pixels;
   a data signal transferor configured to supply a video signal to the pixels;
   a first controller configured to supply, to the data signal transferor, the video signal, the video signal of a stereoscopic image of a picture and including first frame information of a first frame of the stereoscopic image and second frame information of a second frame of the stereoscopic image; and
   a synchronizing signal transmitter configured to transmit, to a viewer, a video synchronizing signal that indicates a timing of switching between the first frame and the second frame of the stereoscopic image; and
   the first controller further configured to cause the scanning signal transferor to supply a first scanning signal that corresponds to a first picture to the lines in the display from a head line to a final line, and a second scanning signal that corresponds to a second picture subsequent to the first picture to the lines in the display from the final line to the head line;
the viewer, including:
   two lenses, each including an electronic shutter;
   a receiver configured to receive the video synchronizing signal;
   a second controller configured to open and close the electronic shutter of each of the two lenses according to the video synchronizing signal; and
   the second controller further configured to cause the electronic shutter of each of the two lenses to be in a closed state when the electronic shutter of one of the two lenses switches from one of an open state and the closed state to the other of the open state and the closed state.

2. The video display system according to claim 1, wherein the first controller is configured to cause the scanning signal transferor to:

supply a first frame signal of the first scanning signal that corresponds to a first frame of the first picture to the lines in the display from the head line to the final line, and
supply, subsequently, a black signal that corresponds to the first frame of the first picture to the lines in the display from the head line to the final line for a predetermined period of time until the first controller causes the scanning signal transferor to supply a second frame signal of the first scanning signal that corresponds to a second frame of the first picture to the lines in the display from the head line to the final line, the second frame of the first picture being subsequent to the first frame of the first picture.

3. The video display system according to claim 2, wherein, when causing the scanning signal transferor to supply the black signal that corresponds to the first frame of the first picture to the lines in the display from the head line to the final line, the first controller is configured to cause the scanning signal transferor to continuously supply, until the electronic shutter of each of the two lenses is in the closed state, the first frame signal of the first scanning signal that corresponds to the first frame of the first picture without inserting the black signal that corresponds to the first frame of the first picture.

4. The video display system according to claim 3, wherein the first controller is configured to cause the scanning signal transferor to simultaneously supply, when the electronic shutter of each of the two lenses is in the closed state, the black signal that corresponds to the first frame of the first picture to a line into which the black signal that corresponds to the first frame of the first picture has not been inserted.

5. The video display system according to claim 1, wherein the first controller is configured to cause the scanning signal transferor to:
supply a second frame signal of the first scanning signal that corresponds to a second frame of the first picture to the lines in the display from the head line to the final line, and
supply, subsequently, a first frame signal of the second scanning signal that corresponds to a first frame of the second picture to the lines in the display from the final line to the head line at a same speed as a speed at which the scanning signal transferor has been caused to supply the second frame signal of the first scanning signal that corresponds to the second frame of the first picture.

6. The video display system according to claim 2, wherein the first controller is configured to cause the scanning signal transferor to:
supply the second frame signal of the first scanning signal that corresponds to the second frame of the first picture to the lines in the display from the head line to the final line, and
supply, subsequently, a second black signal that corresponds to the second frame of the first picture to the lines in the display from the head line to the final line for a predetermined period of time until the first controller causes the scanning signal transferor to supply a first frame signal of the second scanning signal that corresponds to a first frame of the second picture to the lines in the display from the final line to the head line, the first frame of the second picture being subsequent to the second frame of the first picture.

7. The video display system according to claim 6, wherein, when causing the scanning signal transferor to supply the second black signal that corresponds to the second frame of the first picture to the lines in the display from the head line to the final line, the first controller is configured to cause the scanning signal transferor to supply the second black signal that corresponds to the second frame of the first picture:

to the head line that is to be supplied with the second black signal that corresponds to the second frame of the first picture, for a period of time that is double a length of the head line that is to be supplied with the second black signal that corresponds to the second frame of the first picture; and to the final line that is to be supplied with the second black signal that corresponds to the second frame of the first picture, for a period of time from when the scanning signal transferor completes supplying the second frame signal of the first scanning signal that corresponds to the second frame of the first picture and which is to be supplied to the final line to when the scanning signal transferor starts supplying the first frame signal of the second scanning signal that corresponds to the first frame of the second picture and which is to be supplied to the final line.

8. The video display system according to claim 6, wherein the second black signal is not supplied to the final line that is to be supplied with the second black signal that corresponds to the second frame of the first picture, when there is no time interval between when the scanning signal transferor completes supplying the second frame signal of the first scanning signal that corresponds to the second frame of the first picture and which is to be supplied to the final line and when the scanning signal transferor starts supplying the first frame signal of the second scanning signal that corresponds to the first frame of the second picture and which is to be supplied to the final line.

9. The video display system according to claim 6, wherein, when causing the scanning signal transferor to supply the second black signal that corresponds to the second frame of the first picture to the lines in the display from the head line to the final line, the first controller is configured to cause the scanning signal transferor to continuously supply, until the electronic shutter of each of the two lenses is in the closed state, the second frame signal of the first scanning signal that corresponds to the second frame of the first picture without inserting the second black signal that corresponds to the second frame of the first picture.

10. The video display system according to claim 9, wherein the first controller is configured to cause the scanning signal transferor to simultaneously supply, when the electronic shutter of each of the two lenses is in the closed state, the second black signal that corresponds to the second frame of the first picture to a line into which the second black signal that corresponds to the second frame of the first picture has not been inserted.

11. The video display system according to claim 1, wherein the first controller is configured to cause the scanning signal transferor to:

supply a first frame signal of the second scanning signal that corresponds to a first frame of the second picture to the lines in the display from the final line to the head line, and supply, subsequently, a black signal that corresponds to the first frame of the second picture to the lines in the display from the final line to the head line for a predetermined period of time until the first controller causes the scanning signal transferor to supply a second frame signal of the second scanning signal that corresponds to the second frame of the second picture to the lines in the display from the final line to the head line, the second frame of the second picture being subsequent to the first frame of the second picture.

12. The video display system according to claim 11, wherein, when causing the scanning signal transferor to supply the black signal that corresponds to the first frame of the second picture to the lines in the display from the head line to the final line, the first controller is configured to cause the scanning signal transferor to continuously supply, until the electronic shutter of each of the two lenses is in the closed state, the first frame signal of the second scanning signal that corresponds to the first frame of the second picture without inserting the black signal that corresponds to the first frame of the second picture.

13. The video display system according to claim 12, wherein the first controller is configured to cause the scanning signal transferor to simultaneously supply, when the electronic shutter of each of the two lenses is in the closed state, the black signal that corresponds to the first frame of the second picture to the lines from the final line to a predetermined line.

14. The video display system according to claim 1, wherein the first controller is configured to segment a screen on which a video is displayed by the display into plural screen areas, and to cause the scanning signal transferor to supply a segmented scanning signal that corresponds to one of the plural screen areas to each of the plural screen areas.

15. The video display system according to claim 14, wherein the first controller is configured to cause the scanning signal transferor to supply, for a same frame, the segmented scanning signal to the plural screen areas in a same line direction.

16. The video display system according to claim 15, wherein the first controller is configured to cause the scanning signal transferor to supply the segmented scanning signal to the plural screen areas in the same line direction which is one of a direction from the head line to the final line and a direction from the final line to the head line.

17. The video display system according to claim 14, wherein the first controller is configured to cause the scanning signal transferor to supply, for the same frame, the segmented scanning signal to the plural screen areas in a reverse line direction.

18. The video display system according to claim 17, wherein, when causing the scanning signal transferor to supply the segmented scanning signal to one of the plural screen areas in the reverse line direction that is a direction from the head line to the final line, the first controller is configured to cause the scanning signal transferor to supply the segmented scanning signal to an other of the plural screen areas in a direction from the final line to the head line.

19. The video display system according to claim 1, wherein the displayer includes an input for receiving the video signal.

20. The video display system according to claim 1, wherein the displayer includes:

an input for receiving an unseparated video signal from which the first frame information of the first frame and the second frame information of the second frame are not separated; and a signal processor configured to generate video signals of the first frame and the second frame of the stereoscopic image of the picture by separating the first frame information of the first frame and the second frame information of the second frame from the unseparated video signal, and to output the generated video signals to the first controller.

21. The video display system according to claim 1, wherein the video signal is a signal voltage that corresponds to the video signal.

22. The video display system according to claim 1, wherein each of the pixels includes a light-emitting element and a drive element that controls driving of the light-emitting element.

23. The video display system according to claim 22, wherein the drive element controls an electric current supply to the light-emitting element.

24. The video display system according to claim 23, wherein the light-emitting element is an organic electroluminescence element.

25. A video display method for use with a displayer and a viewer, the displayer, including:
- a display that includes pixels arranged in lines;
- a scanning signal transferor configured to supply scanning signals to the pixels for driving the pixels;
- a data signal transferor configured to supply a video signal to the pixels;
- a first controller configured to supply, to the data signal transferor, the video signal, the video signal of a stereoscopic image of a picture and including first frame information of a first frame of the stereoscopic image and second frame information of a second frame of the stereoscopic image; and
- a synchronizing signal transmitter configured to transmit, to the viewer, a video synchronizing signal that indicates a timing of switching between the first frame and the second frame of the stereoscopic image, the viewer, including:
- two lenses, each including an electronic shutter;
- a receiver configured to receive the video synchronizing signal; and
- a second controller configured to open and close the electronic shutter of each of the two lenses according to the video synchronizing signal, and the video display method, comprising:
- causing, by the first controller, the scanning signal transferor to supply a first scanning signal that corresponds to a first picture to the lines in the display from a head line to a final line;
- causing, by the first controller, the scanning signal transferor to supply a second scanning signal that corresponds to a second picture subsequent to the first picture to the lines in the display from the final line to the head line; and
- causing, by the second controller, the electronic shutter of each of the two lenses to be in a closed state when the electronic shutter of one of the two lenses switches from one of an open state and the closed state to the other of the open state and the closed state.

26. A display apparatus, comprising:
a display that includes pixels arranged in lines;
a scanning signal transferor configured to supply scanning signals to the pixels for driving the pixels;
a data signal transferor configured to supply a video signal to the pixels;
a controller configured to supply, to the data signal transferor, the video signal, the video signal of a stereoscopic image of a picture and including first frame information of a first frame of the stereoscopic image and second frame information of a second frame of the stereoscopic image; and
wherein the controller is configured to cause the scanning signal transferor to supply a first scanning signal that corresponds to a first picture to the lines in the display from a head line to a final line, and a second scanning signal that corresponds to a second picture subsequent to the first picture to the lines in the display from the final line to the head line.

27. The display apparatus according to claim 26, wherein each of the pixels includes a light-emitting element and a drive element which controls driving of the light-emitting element.

28. The display apparatus according to claim 27, wherein the drive element controls an electric current supply to the light-emitting element.

29. The display apparatus according to claim 28, wherein the light-emitting element is an organic electroluminescence element.

30. The display apparatus according to claim 26, wherein the controller is configured to cause the scanning signal transferor to:
- supply a first frame signal of the first scanning signal that corresponds to a first frame of the first picture to the lines in the display from the head line to the final line, and
- supply, subsequently, a black signal that corresponds to the first frame of the first picture to the lines in the display from the head line to the final line for a predetermined period of time until the controller causes the scanning signal transferor to supply a second frame signal of the first scanning signal that corresponds to a second frame of the first picture to the lines in the display from the head line to the final line, the second frame of the first picture being subsequent to the first frame of the first picture.

31. The display apparatus according to claim 26, wherein the controller is configured to cause the scanning signal transferor to:
- supply a second frame signal of the first scanning signal that corresponds to a second frame of the first picture to the lines in the display from the head line to the final line, and
- supply, subsequently, a first frame signal of the second scanning signal that corresponds to a first frame of the second picture to the lines in the display from the final line to the head line at a same speed as a speed at which the scanning signal transferor is caused to supply the second frame signal of the first scanning signal that corresponds to the second frame of the first picture.

32. The display apparatus according to claim 30, wherein the controller is configured to cause the scanning signal transferor to:
- supply the second frame signal of the first scanning signal that corresponds to the second frame of the first picture to the lines in the display from the head line to the final line, and
- supply, subsequently, a second black signal that corresponds to the second frame of the first picture to the lines in the display from the head line to the final line for a predetermined period of time until the controller causes the scanning signal transferor to supply a first frame signal of the second scanning signal that corresponds to a first frame of the second picture to the lines in the display from the final line to the head line, the first frame of the second picture being subsequent to the second frame of the first picture.

33. The display apparatus according to claim 32, wherein, when causing the scanning signal transferor to supply the second black signal that corresponds to the second frame of the first picture to the lines in the display from the head line to the final line, the controller is configured to cause the scanning signal transferor to supply the second black signal:

to the head line for a period of time that is double a length of the head line; and to the final line for a period of time from when the scanning signal transferor completes supplying the second frame signal of the first scanning signal that corresponds to the second frame of the first picture and which is to be supplied to the final line to when the scanning signal transferor starts supplying the first frame signal of the second scanning signal that corresponds to the first frame of the second picture and which is to be supplied to the final line.

34. The display apparatus according to claim 26, wherein the controller is configured to cause the scanning signal transferor to:

supply a first frame signal of the second scanning signal that corresponds to a first frame of the second picture to the lines in the display from the final line to the head line, and supply, subsequently, a black signal that corresponds to the first frame of the second picture to the lines in the display from the final line to the head line for a predetermined period of time until the controller causes the scanning signal transferor to supply a second frame signal of the second scanning signal that corresponds to a second frame of the second picture to the lines in the display from the final line to the head line, the second frame of the second picture being subsequent to the first frame of the second picture.

\* \* \* \* \*